US008544037B2

(12) United States Patent
Terada et al.

(10) Patent No.: US 8,544,037 B2
(45) Date of Patent: Sep. 24, 2013

(54) DIGEST CREATING METHOD AND DEVICE

(75) Inventors: Yoshihisa Terada, Chiba-ken (JP);
Hiroshi Kasahara, Tokyo (JP); Toru Nakada, Kanagawa-ken (JP)

(73) Assignee: Panasonic Corporation, Osaka (JP)

( * ) Notice: Subject to any disclaimer, the term of this patent is extended or adjusted under 35 U.S.C. 154(b) by 1250 days.

(21) Appl. No.: 11/572,957

(22) PCT Filed: Jul. 25, 2005

(86) PCT No.: PCT/JP2005/013574
§ 371 (c)(1),
(2), (4) Date: Jan. 16, 2008

(87) PCT Pub. No.: WO2006/011447
PCT Pub. Date: Feb. 2, 2006

(65) Prior Publication Data
US 2008/0196058 A1 Aug. 14, 2008

(30) Foreign Application Priority Data

Jul. 30, 2004 (JP) ................................. 2004-223135
Jul. 21, 2005 (JP) ................................. 2005-211614

(51) Int. Cl.
*H04N 7/10* (2006.01)
*H04N 9/64* (2006.01)
*H04N 5/93* (2006.01)
*G06F 3/00* (2006.01)
*G11B 27/00* (2006.01)

(52) U.S. Cl.
USPC ............ 725/32; 715/719; 715/720; 715/721; 715/722; 715/723; 715/724; 715/725; 715/726; 348/559; 386/278

(58) Field of Classification Search
None
See application file for complete search history.

(56) References Cited

U.S. PATENT DOCUMENTS 5,717,879 A * 2/1998 Moran et al. .................. 715/716
6,334,022 B1 * 12/2001 Ohba et al. ................... 386/231
(Continued)

FOREIGN PATENT DOCUMENTS

JP 09-065287 3/1997
JP 11-238071 A 8/1999
(Continued)

OTHER PUBLICATIONS

International Search Report for Application No. PCT/JP2005/013574 dated Nov. 1, 2005.

*Primary Examiner* — Nasser Goodarzi
*Assistant Examiner* — Mary A Kay
(74) *Attorney, Agent, or Firm* — RatnerPrestia

(57) ABSTRACT

An apparatus includes an input unit to which replay information including a broadcasting section of a replay video and a reference section representing an actual filming time zone, and information for designating a length of a digest are input; a replay importance degree computing unit that obtains the number of replays, an interval between predetermined positions of the replay broadcasting section and the replay reference section, a time length of replay broadcasting, speed of replay broadcasting, the number of cut switches of the replay from the replay information, and computes the importance degree of the replay video on the basis of these items; and a digest creating unit that sets the replay video as a digest candidate, and selects a combination of the digest candidates based on a length condition of the digest and a composite importance degree of the combination of digest candidates.

24 Claims, 35 Drawing Sheets

(56) References Cited

U.S. PATENT DOCUMENTS

| | | |
|---|---|---|
| 6,771,875 B1 * | 8/2004 | Kunieda et al. ............... 386/241 |
| 6,795,092 B1 * | 9/2004 | Nagai et al. .................... 715/716 |
| 2002/0080937 A1 * | 6/2002 | Kawamura ............... 379/102.03 |
| 2002/0157095 A1 * | 10/2002 | Masumitsu et al. ............ 725/46 |
| 2002/0184220 A1 * | 12/2002 | Teraguchi et al. ............. 707/10 |
| 2002/0197053 A1 * | 12/2002 | Nakamura et al. .............. 386/35 |
| 2003/0215216 A1 | 11/2003 | Hashimoto et al. |
| 2004/0088723 A1 * | 5/2004 | Ma et al. ......................... 725/19 |
| 2005/0147378 A1 * | 7/2005 | Hira ................................ 386/46 |
| 2009/0144608 A1 * | 6/2009 | Oisel et al. .................... 715/230 |

FOREIGN PATENT DOCUMENTS

| | | |
|---|---|---|
| JP | 2000-261754 | 9/2000 |
| JP | 2002-290954 A | 10/2002 |
| JP | 2002-300518 | 10/2002 |
| JP | 2003-078878 | 3/2003 |
| JP | 2003-333505 A | 11/2003 |
| WO | WO 03/096229 A2 | 11/2003 |

\* cited by examiner

FIG. 4

| REPLAY INFORMATION | | (EXPLANATION) |
|---|---|---|
| | REPLAY NUMBER | NUMBER FOR IDENTIFYING REPLAY |
| LOOP | REPLAY BROADCASTING SECTION START TIME | START TIME OF REPLAY BROADCASTING |
| | REPLAY BROADCASTING SECTION END TIME | END TIME OF REPLAY BROADCASTING |
| | REPLAY REFERENCE SECTION START TIME | START TIME OF REFERENCE VIDEO OF REPLAY |
| | REPLAY REFERENCE SECTION END TIME | END TIME OF REFERENCE VIDEO OF REPLAY |
| | FILMING CAMERA NUMBER | CAMERA NUMBER THAT FILMED VIDEO |

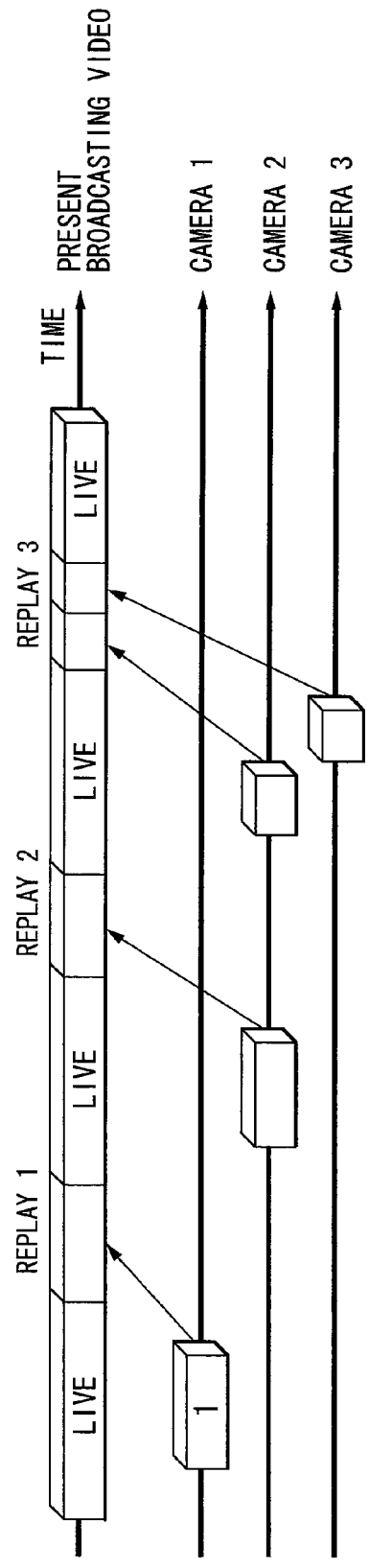

FIG. 7

| DIGEST CONDITION INFORMATION | |
|---|---|
| DESIGNATED LENGTH (SCALE) OF DIGEST | VALUE FOR DESIGNATING SCALE OF DIGEST |

FIG. 8

| REPLAY INFORMATION WITH IMPORTANCE DEGREE | | |
|---|---|---|
| | REPLAY NUMBER | NUMBER FOR IDENTIFYING REPLAY |
| | REPLAY IMPORTANCE DEGREE | REPLAY IMPORTANCE DEGREE |
| LOOP | REPLAY BROADCASTING SECTION START TIME | START TIME OF REPLAY BROADCASTING |
| | REPLAY BROADCASTING SECTION END TIME | END TIME OF REPLAY BROADCASTING |
| | REPLAY REFERENCE SECTION START TIME | START TIME OF REFERENCE VIDEO OF REPLAY |
| | REPLAY REFERENCE SECTION END TIME | END TIME OF REFERENCE VIDEO OF REPLAY |
| | FILMING CAMERA NUMBER | CAMERA NUMBER THAT FILMED VIDEO |

FIG. 9

| DIGEST INFORMATION | | |
|---|---|---|
| LOOP | REPLAY BROADCASTING SECTION START TIME | BROADCASTING START TIME OF VIDEO (REPLAY) TO BE USED AS DIGEST |
| | REPLAY BROADCASTING SECTION END TIME | BROADCASTING END TIME OF VIDEO (REPLAY) TO BE USED AS DIGEST |

| COMBINATION | | TOTAL SECONDS | SUM OF IMPORTANCE DEGREEES |
|---|---|---|---|
| REPLAY 1 | REPLAY 3 | 80 SECONDS | HIGH + MID-LEVEL = HIGH |
| REPLAY 1 | REPLAY 4 | 80 SECONDS | HIGH + LOW = MID-LEVEL |
| REPLAY 3 | REPLAY 4 | 80 SECONDS | MID-LEVEL + LOW = LOW |
FIG. 16(A)
FIG. 16(B)
FIG. 16(C)
FIG. 16(D)
FIG. 16(E)
FIG. 16(F)

FIG. 24(A1) TOP OF SECOND INNING ⊢——————⊣ IMPORTANCE DEGREE (20), TIME (120 SECONDS)
FIG. 24(A2) BATTER 1 ⊢——⊣ IMPORTANCE DEGREE (10), TIME (40 SECONDS)
FIG. 24(A3) 2 3 ⊢⊣ IMPORTANCE DEGREE (5), TIME (20 SECONDS)
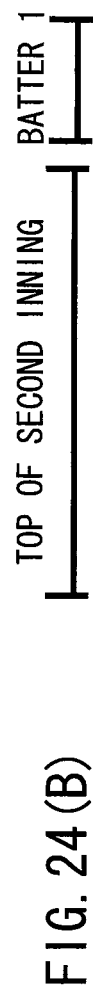
FIG. 24(B) TOP OF SECOND INNING ⊢——————⊣ BATTER 1 ⊢——⊣
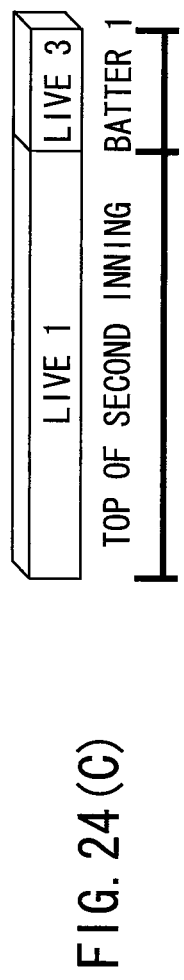
FIG. 24(C) LIVE 1 | LIVE 3 | TOP OF SECOND INNING BATTER 1

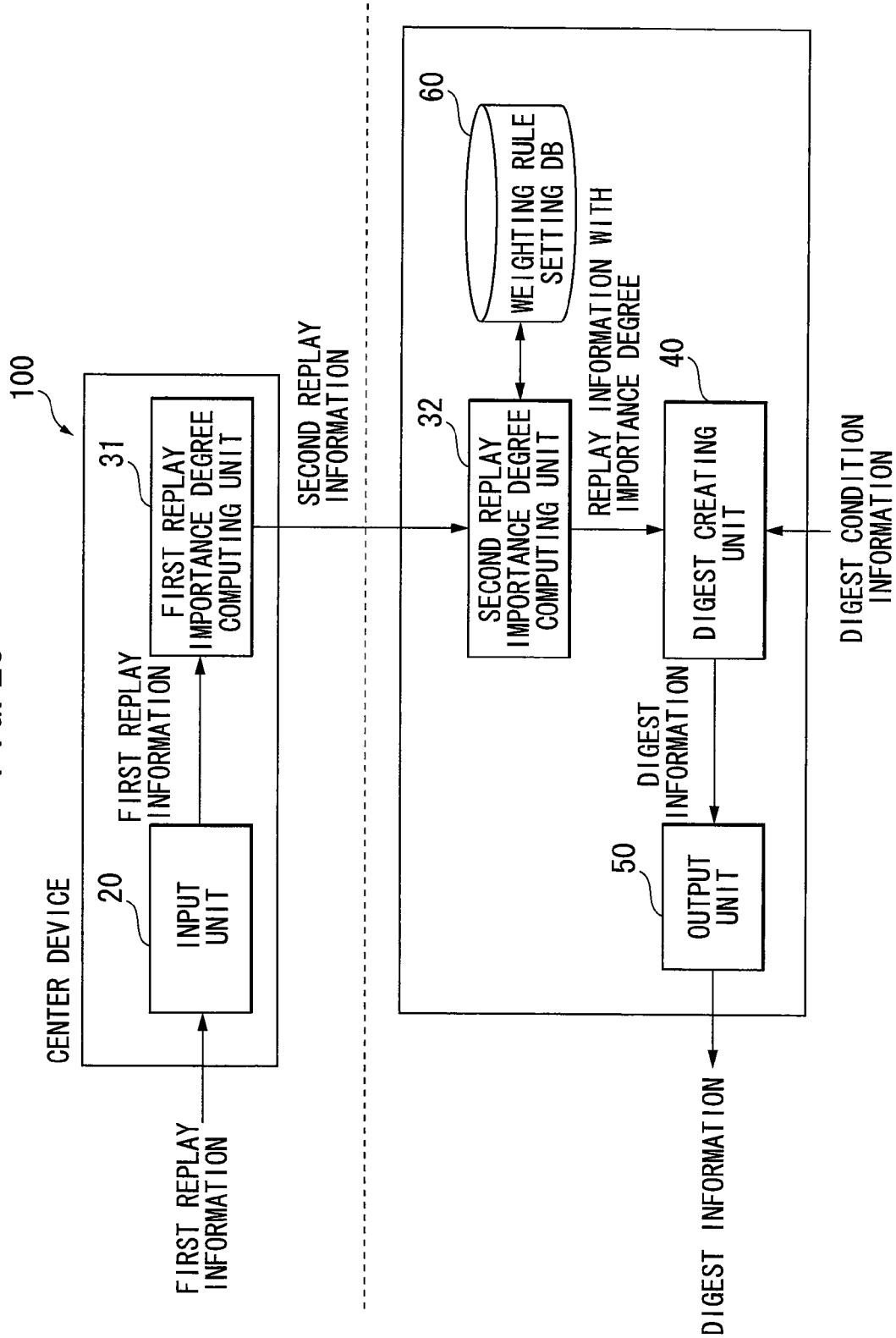

FIG. 26

| FIRST REPLAY INFORMATION | | |
|---|---|---|
| | REPLAY NUMBER | NUMBER FOR IDENTIFYING REPLAY |
| | REPLAY BROADCASTING SECTION START TIME | START TIME OF REPLAY BROADCASTING |
| | REPLAY BROADCASTING SECTION END TIME | END TIME OF REPLAY BROADCASTING |
| | REPLAY REFERENCE SECTION START TIME | START TIME OF REFERENCE VIDEO OF REPLAY |
| | REPLAY REFERENCE SECTION END TIME | END TIME OF REFERENCE VIDEO OF REPLAY |
| | FILMING CAMERA NUMBER | CAMERA NUMBER THAT FILMED VIDEO |

FIG. 27

| SECOND REPLAY INFORMATION | | |
|---|---|---|
| | REPLAY NUMBER | NUMBER FOR IDENTIFYING REPLAY |
| | REPLAY BROADCASTING SECTION START TIME | START TIME OF REPLAY BROADCASTING |
| | REPLAY BROADCASTING SECTION END TIME | END TIME OF REPLAY BROADCASTING |
| | REPLAY REFERENCE SECTION START TIME | START TIME OF REFERENCE VIDEO OF REPLAY |
| | REPLAY REFERENCE SECTION END TIME | END TIME OF REFERENCE VIDEO OF REPLAY |
| | FILMING CAMERA NUMBER | CAMERA NUMBER THAT FILMED VIDEO |
| | NUMBER-OF-TIMES IMPORTANCE DEGREE | IMPORTANCE DEGREE ON THE BASIS OF NUMBER OF BROADCASTS OF REPLAY OF THE SAME CONTENTS |
| | INTERVAL IMPORTANCE DEGREE | IMPORTANCE DEGREE ON THE BASIS OF INTERVAL BETWEEN FILMING TIME AND BROADCASTING TIME OF REPLAY VIDEO |
| | LENGTH IMPORTANCE DEGREE | IMPORTANCE DEGREE ON THE BASIS OF BROADCASTING TIME LENGTH OF REPLAY |
| | REPRODUCING SPEED IMPORTANCE DEGREE | IMPORTANCE DEGREE ON THE BASIS OF REPRODUCING SPEED OF REPLAY |
| | NUMBER-OF-SWITCHES IMPORTANCE DEGREE | IMPORTANCE DEGREE ON THE BASIS OF NUMBER OF CAMERA SWITCHES DURING REPLAY |
| | ... | ... |

FIG. 28

| REPLAY INFORMATION WITH INPORTANCE DEGREE | |
|---|---|
| REPLAY NUMBER | NUMBER FOR IDENTIFYING REPLAY |
| REPLAY BROADCASTING SECTION START TIME | START TIME OF REPLAY BROADCASTING |
| REPLAY BROADCASTING SECTION END TIME | END TIME OF REPLAY BROADCASTING |
| REPLAY REFERENCE SECTION START TIME | START TIME OF REFERENCE VIDEO OF REPLAY |
| REPLAY REFERENCE SECTION END TIME | END TIME OF REFERENCE VIDEO OF REPLAY |
| FILMING CAMERA NUMBER | CAMERA NUMBER THAT FILMED VIDEO |
| NUMBER-OF-TIMES IMPORTANCE DEGREE | IMPORTANCE DEGREE ON THE BASIS OF NUMBER OF BROADCASTS OF REPLAY OF THE SAME CONTENTS |
| INTERVAL IMPORTANCE DEGREE | IMPORTANCE DEGREE ON THE BASIS OF INTERVAL BETWEEN FILMING TIME AND BROADCASTING TIME OF REPLAY VIDEO |
| LENGTH IMPORTANCE DEGREE | IMPORTANCE DEGREE ON THE BASIS OF BROADCASTING TIME LENGTH OF REPLAY |
| REPRODUCING SPEED IMPORTANCE DEGREE | IMPORTANCE DEGREE ON THE BASIS OF REPRODUCING SPEED OF REPLAY |
| NUMBER-OF-SWITCHES IMPORTANCE DEGREE | IMPORTANCE DEGREE ON THE BASIS OF NUMBER OF CAMERA SWITCHES DURING REPLAY |
| ... | ... |
| REPLAY IMPORTANCE DEGREE | REPLAY IMPORTANCE DEGREE |

FIG. 30

WEIGHTING RULE SETTING TABLE

| | NUMBER OF TIMES ($\alpha 1$) | INTERVAL ($\alpha 2$) | LENGTH ($\alpha 3$) | REPRODUCING SPEED ($\alpha 3$) | NUMBER OF SWITCHES ($\alpha 3$) | ... |
|---|---|---|---|---|---|---|
| BASEBALL | 1.5 | 1.5 | 1 | 0.5 | 1 | ... |
| SOCCER | 1 | 0.5 | 1 | 1.5 | 1 | ... |
| GOLF | 1 | 1.5 | 1 | 1 | 0.5 | ... |
| ... | ... | ... | ... | ... | ... | ... |

DIGEST CREATING METHOD AND DEVICE

This Application is a U.S. National Phase Application of PCT International Application PCT/W2005/013574.

BACKGROUND OF THE INVENTION

1. Field of the Invention

The present invention relates to a method of creating a digest by use of a program video and the like of the present broadcasting, and a device and a program which execute the method. The present invention particularly aims at creating a digest without an effort.

2. Description of the Related Art

If broadcasting data of, for example, a baseball broadcast is broadcasted while including discrimination information of highlight scenes in the digital broadcasting, a receiving device can create a digest composed of the highlight scenes by accumulating received information. As a result, viewers can view a game in a digest format in a preferred time zone.

Further, the digest creation is necessary in the case of introducing summarized game contents in a segment of a sport program even in a broadcasting station.

Japanese Patent Application Laid-Open No. 1997-65287 discloses a method of creating a digest by extracting and piecing replay videos included in a broadcasting video, as a simple method of creating a digest. A scene replayed in a broadcast is a part such as a scoring scene which is determined as important by the broadcast transmitting side, and therefore it is possible to automatically create a digest representing important scenes by extracting and piecing the replay videos.

However, since the replay videos are merely pieced in this case, the length (hereinafter, referred to as "scale") of a digest is automatically set depending on the length of the replay scenes. As a result, the scale of the digest can not be adjusted. In order to adjust the scale, it is necessary that an importance degree is given to each scene and a scene to be included in the digest is selected on the basis of the importance degree.

Japanese Patent Application Laid-Open No. 2002-300518 discloses a digest creating method capable of adjusting the scale. In this method, the broadcasting station side transmits a program to which indexes for digest creation such as "enthusiasm degree" evaluated from cheers of spectators and "game parameter" indicating progress information of a game are added. A receiving device creates a digest by selecting a cut with a high evaluation value in accordance with the scale of the digest with the use of these indexes.

FIG. 35 schematically shows a digest creating device 110 that executes the method. The device 110 includes an input unit 120 to which information, as the "index information" such as "enthusiasm degree" and "game parameter" output from an input terminal 160 and production parameter information output from an editing device 170 and a switcher 180 are input, an importance degree computing unit 130 which computes the importance degree of each cut of a program on the basis of the index information, a digest creating unit 140 which creates digest information by selecting a cut with a high evaluation value in accordance with the scale, and an output unit 150 which outputs the digest information.

"Enthusiasm degree" is a value that is subjectively evaluated by an evaluator on the basis of an importance degree, a tension degree, and an enthusiastic status of spectators of a scene in a game, and the evaluator inputs the value with a terminal. "Game parameter" is information that indicates which is the offensive side or the defensive side and information that indicates scoring information, occurrence of a foul play, interruption of a game and the like. "Player information" is information that represents all players displayed on a screen. Further, "production parameter" is information that indicates a cut switching time, information that indicates whether or not a commercial is currently being broadcasted, information that indicates a start position and an end position of a replay, and the like.

The importance degree computing unit 130 performs weighting with respect to the input index information depending on preference information of a viewer and the like, and then the importance degree of each cut is obtained by adding the index information. The digest creating unit 140 selects cuts with high importance degrees until the length of the cuts reaches the pre-set digest length so as to create the digest information. The cuts designated in the digest information are selectively reproduced among accumulated video/sound data of a program, and the digest is displayed.

However, the method described in Japanese Patent Application Laid-Open No. 2002-300518 involves a problem that the creation of the information such as "enthusiasm degree" added to a program incurs extremely high costs.

The present invention is to address such a conventional problem, and the object thereof is to provide a digest creating method in which a digest in accordance with a scale can be created in an extremely simple manner, and to provide a device and a computer program which execute the method.

SUMMARY OF THE INVENTION

A digest creating device according to the present invention includes: an input unit to which replay information including replay broadcasting section information for specifying a broadcasting time zone of a replay video/sound and replay reference section information for specifying an actual filming/recording time zone of the replay video/sound, and digest condition information for designating the length of a digest are input; a replay importance degree computing unit that computes an importance degree of the replay video/sound by use of at least one of the number of replays, an interval between predetermined positions of the replay broadcasting section and the replay reference section, a time length of replay broadcasting, speed of replay broadcasting, and the number of cut switches of the replay, all of which are obtained from the replay information, and outputs replay information with an importance degree in which the importance degree is added to the replay information; and a digest creating unit that receives the replay information with an importance degree and the digest condition information, sets the replay video/sound as a digest candidate to select one digest candidate or a combination of digest candidates with the largest sum of the importance degrees within a range of the designated length of the digest, and outputs information for specifying from where the digest candidates are obtained.

In the device, by use of easily-available information from a history of a broadcasting device, digest information that satisfies a length condition can be created.

Further, the digest creating unit of the digest creating device according to the present invention selects the combination of the digest candidates by excluding the replay video/sound of which the importance degree is not the largest among a plurality of replay videos/sounds in which the replay reference sections overlap with each other, from the digest candidates.

Thereby, a digest containing much information can be created within the designated time length of a digest.

Further, a digest creating device according to the present invention includes: an input unit to which replay information including replay broadcasting section information for specifying a broadcasting time zone of a replay video/sound and replay reference section information for specifying an actual filming/recording time zone of the replay video/sound, digest condition information for designating the length of a digest, and information for indicating a section of a video/sound are input; a replay importance degree computing unit that computes an importance degree of the replay video/sound by use of at least one of the number of replays, an interval between predetermined positions of the replay broadcasting section and the replay reference section, a time length of replay broadcasting, speed of replay broadcasting, and the number of cut switches of the replay, all of which are obtained from the replay information, and outputs replay information with an importance degree in which the importance degree is added to the replay information; and a digest creating unit that receives the replay information with an importance degree and the digest condition information, sets the video/sound of the section containing the replay reference section of the replay video/sound as a digest candidate having the importance degree of the replay video/sound to select one digest candidate or a combination of digest candidates with the largest sum of the importance degrees within a range of the designated length of the digest, and outputs information for specifying from where the digest candidates are obtained.

In the device, in place of the replay video/sound, another video/sound in a time zone where the replay video/sound was filmed/recorded can be included in a digest.

Further, a digest creating device according to the present invention includes: an input unit to which replay information including replay broadcasting section information for specifying a broadcasting time zone of a replay video/sound and replay reference section information for specifying an actual filming/recording time zone of the replay video/sound, digest condition information for designating the length of a digest, and cut specifying information for indicating a switching point of a broadcasting cut of a video/sound are input; a replay importance degree computing unit that computes an importance degree of the replay video/sound by use of at least one of the number of replays, an interval between predetermined positions of the replay broadcasting section and the replay reference section, a time length of replay broadcasting, speed of replay broadcasting, and the number of cut switches of the replay, all of which are obtained from the replay information, and outputs replay information with an importance degree in which the importance degree is added to the replay information; and a digest creating unit that receives the replay information with an importance degree, the digest condition information, and the cut specifying information, sets the broadcasting cut containing the replay reference section of the replay video/sound as a digest candidate having the importance degree of the replay video/sound to select one digest candidate or a combination of digest candidates with the largest sum of the importance degrees within a range of the designated length of the digest, and outputs the broadcasting section information of the digest candidates.

In the device, a broadcasting cut in a time zone where the replay video/sound was filmed/recorded can be included in a digest.

Further, a digest creating device according to the present invention includes: an input unit to which replay information including replay broadcasting section information for specifying a broadcasting time zone of a replay video/sound and replay reference section information for specifying an actual filming/recording time zone of the replay video/sound, digest condition information for designating the length of a digest, and scene information for indicating a scene of a broadcasting video/sound are input; a replay importance degree computing unit that computes an importance degree of the replay video/sound by use of at least one of the number of replays, an interval between predetermined positions of the replay broadcasting section and the replay reference section, a time length of replay broadcasting, speed of replay broadcasting, and the number of cut switches of the replay, all of which are obtained from the replay information, and outputs replay information with an importance degree in which the importance degree is added to the replay information; and a digest creating unit that receives the replay information with an importance degree, the digest condition information, and the scene information, sets the scene of the video/sound segment of the scene information containing the replay reference section of the replay video/sound as a digest candidate having the importance degree of the replay video/sound to select one digest candidate or a combination of digest candidates with the largest sum of the importance degrees within a range of the designated length of the digest, and outputs information for specifying from where the digest candidates are obtained.

In the device, a scene of a video/sound in a time zone where the replay video/sound was filmed/recorded can be included in a digest.

Further, the digest creating unit of the device changes a size of the scene of the video/sound containing the replay reference section in accordance with the importance degree of the replay video/sound.

Therefore, in the case where the importance degree of the replay video/sound is high, a long scene can be selected, and in the case where the importance degree of the replay video/sound is low, a short scene can be selected.

Further, the replay importance degree computing unit of the digest creating device according to the present invention adds the importance degrees to a plurality of replay videos/sounds in which the replay broadcasting sections are arranged in series and the replay reference sections do not overlap with each other.

Therefore, a plurality of replays broadcasted as highlights are likely to be taken in a digest, and thus the quality of the digest is improved.

Further, a digest creating method according to the present invention includes the steps of: computing the importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; and selecting one digest candidate or a combination of digest candidates with the largest sum of the importance degrees within a range of the designated length of a digest by setting the replay video/sound as the digest candidate to output information for specifying from where the digest candidates are obtained.

In the method, by use of easily-available information from a history of a broadcasting device, digest information that satisfies a length condition can be created.

Further, the digest creating method further includes the step of selecting, in the case where there are a plurality of replay videos/sounds in which the relay reference sections overlap with each other, the combination by excluding the replay video/sound of which the importance degree is not the largest among the replay videos/sounds from the digest candidates.

Thereby, a digest containing much information can be created within the designated time length of a digest.

Further, a digest creating method according to the present invention includes the steps of: computing an importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; and selecting one digest candidate or a combination of digest candidates with the largest sum of the importance degrees within a range of the designated length of a digest by setting a video/sound of a section containing the replay reference section of the replay video/sound as the digest candidate having the importance degree of the replay video/sound to output information for specifying from where the digest candidates are obtained.

In the method, in place of the replay video/sound, another video/sound in a time zone where the replay video/sound was filmed/recorded can be included in a digest.

Further, a digest creating method according to the present invention includes the steps of: computing an importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; and selecting one digest candidate or a combination of digest candidates with the largest sum of the importance degrees within a range of the designated length of a digest by setting a broadcasting cut of a video/sound containing the replay reference section of the replay video/sound as the digest candidate having the importance degree of the replay video/sound to output the broadcasting section information of the digest candidates.

In the method, in place of the replay video/sound, a broadcasting cut in a time zone where the replay video/sound was filmed/recorded can be included in a digest.

Further, a digest creating method according to the present invention includes the steps of: computing an importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; and selecting one digest candidate or a combination of digest candidates with the largest sum of the importance degrees within a range of the designated length of a digest by setting a scene of a video/sound segment of scene information containing the replay reference section of the replay video/sound as the digest candidate having the importance degree of the replay video/sound to output information for specifying from where the digest candidates are obtained.

In the method, in place of the replay video/sound, a scene of a video/sound in a time zone where the replay video/sound was filmed/recorded can be included in a digest.

Further, the digest creating method further includes the step of changing the size of the scene of the video/sound containing the replay reference section in accordance with the importance degree of the replay video/sound.

Further, the digest creating method further includes the step of adding the importance degrees to a plurality of replay videos/sounds in which the replay broadcasting sections are arranged in series and the replay reference sections do not overlap with each other.

Thereby, the importance degrees of the replay videos/sounds taken in a digest as highlights become high.

A program according to the present invention causes a computer to execute the procedures of: computing an importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; and selecting one digest candidate or a combination of digest candidates with the largest sum of the importance degrees within a range of a designated length of a digest by setting the replay video/sound as the digest candidate.

Further, a program according to the present invention causes a computer to execute the procedures of: computing an importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; and selecting one digest candidate or a combination of digest candidates with the largest sum of the importance degrees within a range of the designated length of a digest by setting a video/sound of a section containing the replay reference section of the replay video/sound as the digest candidate having the importance degree of the replay video/sound.

A program according to the present invention causes a computer to execute the procedures of: computing an importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; and selecting one digest candidate or a combination of digest candidates with the largest sum of the importance degrees within a range of a designated length of a digest by setting a broadcasting cut of a video/sound containing the replay reference section of the replay video/sound as the digest candidate having the importance degree of the replay video/sound.

A program according to the present invention causes a computer to execute the procedures of: computing an importance degree of a replay video/sound by use of values obtained from at least one of the number of replays, an interval between predetermined positions of a replay broadcasting section and a replay reference section, a time length of replay broadcasting, speed of replay broadcasting, and the number of cut switches of the replay by use of replay information including replay broadcasting section information for specifying a broadcasting time zone of the replay video/sound and replay reference section information for specifying an actual filming/recording time zone of the replay video/sound; selecting a class for a scene of a video/sound segment of scene information in accordance with the importance degree of the replay video/sound; and selecting one digest candidate or a combination of digest candidates with the largest sum of the importance degrees within a range of a designated length of a digest by setting the scene, in the class, of the video/sound containing the replay reference section of the replay video/sound as the digest candidate having the importance degree of the replay video/sound.

The functions of the replay importance degree computing unit and the digest creating unit can be realized by installing these programs in the digest creating device.

In a digest creating device and a digest creating method of the present invention, by use of easily-available information from history information and the like of a broadcasting device, digest information that is associated with a length condition can be created. Further, in the case where scene information of a broadcast is given, a scene in the present broadcasting in a time zone where a replay video was filmed can be included in a digest, and the quality of the digest can be improved by changing the length of the scene in accordance with an importance degree.

BRIEF DESCRIPTION OF THE DRAWINGS

FIG. 4 is a diagram showing a data structure of replay information in the first embodiment of the present invention;

FIGS. 5A and 5B a concrete example showing a relation between replays and replay information;

FIG. 7 is a diagram showing a data structure of digest condition information in the first embodiment of the present invention;

FIG. 8 is a diagram showing a data structure of replay information with an importance degree in the first embodiment of the present invention;

FIG. 9 is a diagram showing a data structure of digest information in the first embodiment of the present invention;

FIGS. 13A and 13B are diagrams showing a relation between replays and replay information in the case where the number of cameras is one;

FIGS. 16A to 16F are diagrams illustrating the digest creating method in the second embodiment of the present invention;

FIGS. 24A1 to 24C are diagrams illustrating procedures of creating digest information in the fourth embodiment of the present invention;

FIG. 25 is a block diagram showing a configuration of a digest creating device in a fifth embodiment of the present invention;

FIG. 26 is a diagram showing a data structure of first replay information in the fifth embodiment of the present invention;

FIG. 27 is a diagram showing a data structure of second replay information in the fifth embodiment of the present invention;

FIG. 28 is a diagram showing a data structure of replay information with an importance degree in the fifth embodiment of the present invention;

FIG. 30 is a diagram showing a weighting rule setting table managed in a database in the fifth embodiment of the present invention;

DETAILED DESCRIPTION OF THE PREFERRED EMBODIMENTS

First Embodiment

Figure 2:
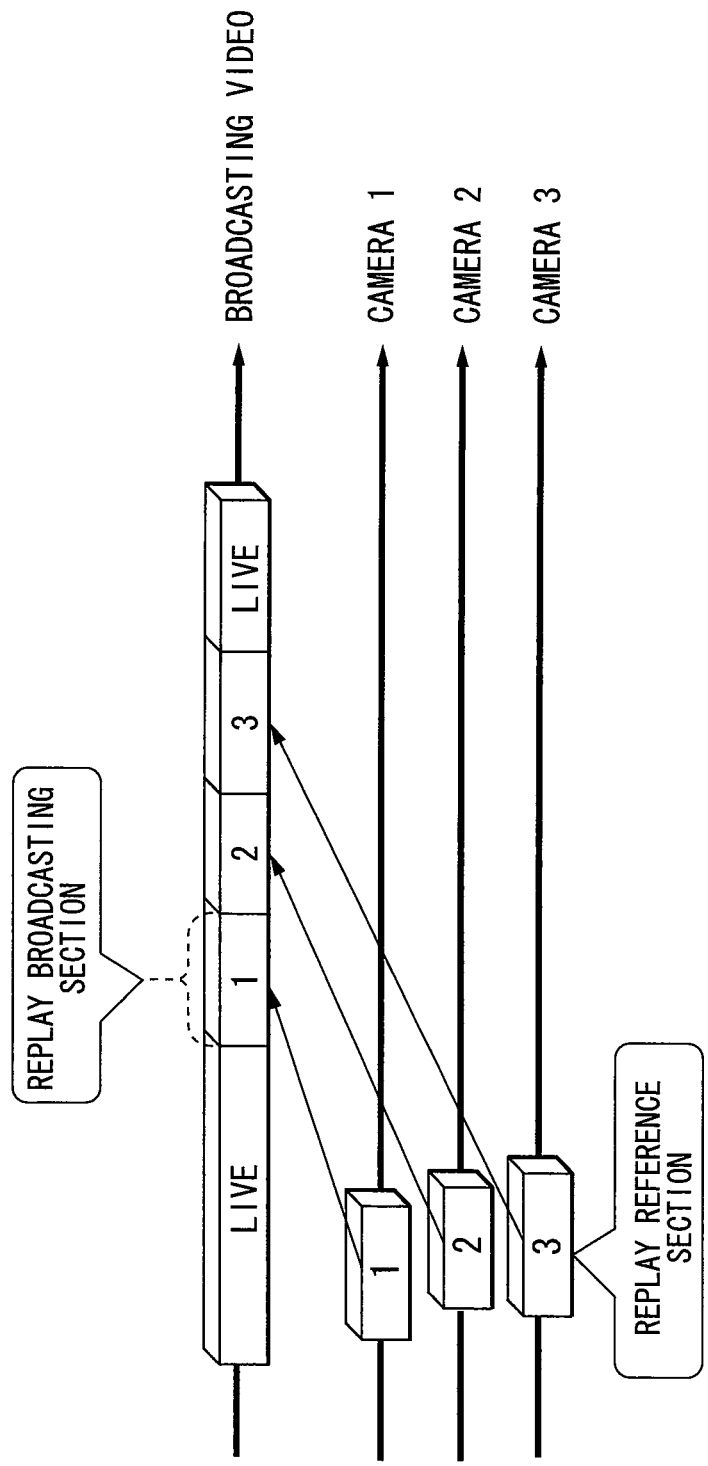
FIG. 2 is a diagram explaining replay broadcasting sections and replay reference sections.
Figure 3:
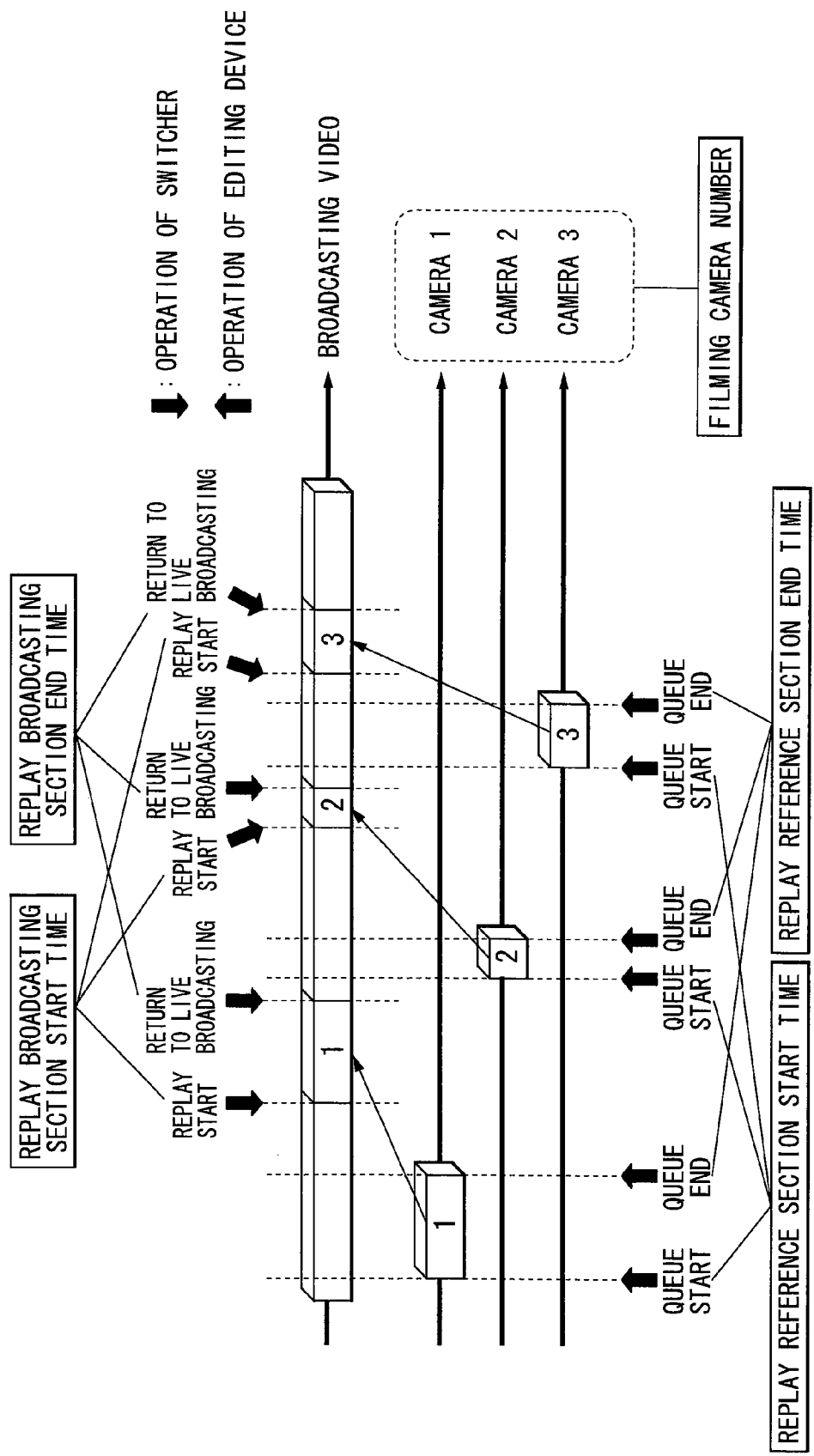
FIG. 3 is a diagram explaining information to be used by the digest creating device in the first embodiment of the present invention.

In the embodiment of the present invention, there will be described a case that a digest in a sport broadcast such as baseball games is created by piecing selected replay videos. As shown in FIG. 2, replay videos in the past are often inserted between a live video of a game to be broadcasted in a sport broadcast. Here, a time zone in which the replay video was actually filmed is referred to as "replay reference section", and a time zone in which the replay video was broadcasted is referred to as "replay broadcasting section". As shown in FIG. 3, the replay reference section starts when an operator who monitors videos of respective cameras in a broadcast station designates a camera number with an editing device to perform "queue operation", and ends with the next "queue operation". The replay broadcasting section starts when the operator operates "replay start" with a switcher, and ends when returning to live broadcasting.

In a digest creating method in the first embodiment of the present invention, replay videos to be taken in a digest are selected on the basis of "replay reference section information" that indicates a start time and an end time of the replay reference section, "camera information" that indicates a filming camera for the replay videos, and "replay broadcasting section information" that indicates a start time and an end time of the replay broadcasting section (all of which are collectively referred to as "replay information").

Figure 1:
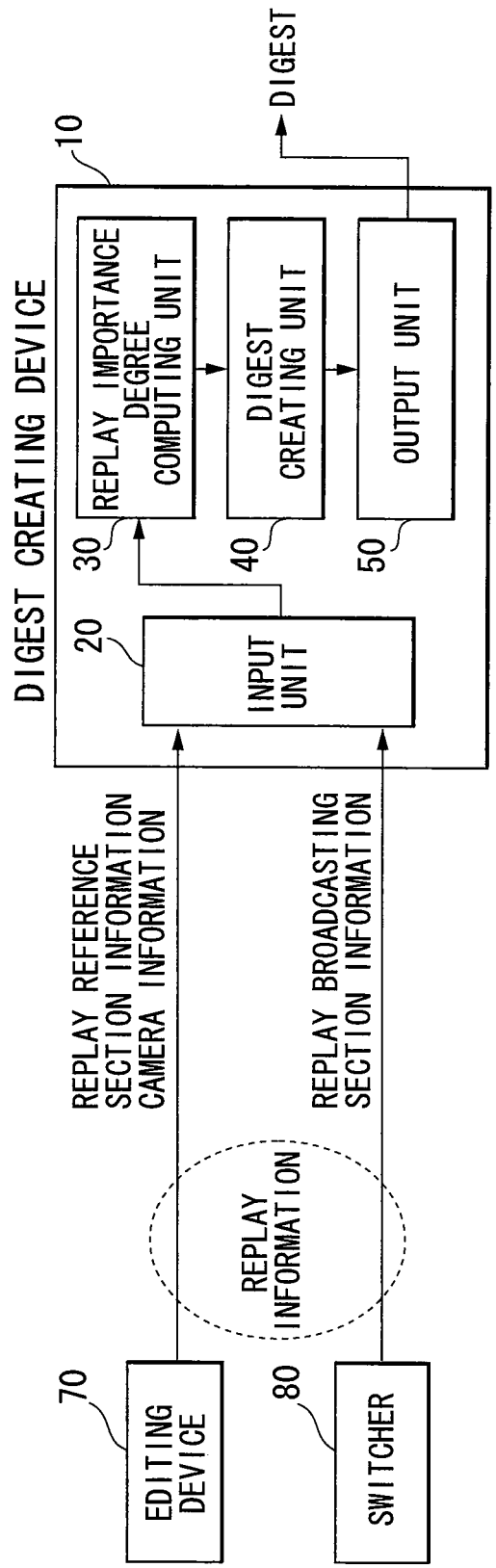
FIG. 1 is a block diagram showing a configuration of a digest creating device in a first embodiment of the present invention.

FIG. 1 shows a configuration of a digest creating device 10 for implementing the method. The device 10 includes the input unit 20 to which the replay information is input from an editing device 70 and a switcher 80, a replay importance degree computing unit 30 that computes the importance degree of the input replay video information, a digest creating unit 40 that creates digest information by selecting replay video information with a high importance degree in accordance with the scale of a digest, and an output unit 50 that outputs the created digest information. A computer incorporated in the digest creating device 10 executes a program for specifying operations so that the replay importance degree computing unit 30 and the digest creating unit 40 are realized.

FIG. 4 shows a data structure of the replay information to be input to the input unit 20. The replay information includes information of a replay broadcasting section start time, a replay broadcasting section end time, a replay reference section start time, a replay reference section end time, and a filming camera number, in addition to a replay number to designate each replay. FIGS. 5A and 5B schematically show a relation between replay videos to be inserted into the present broadcasting and data contents of the replay information.

Figure 6:
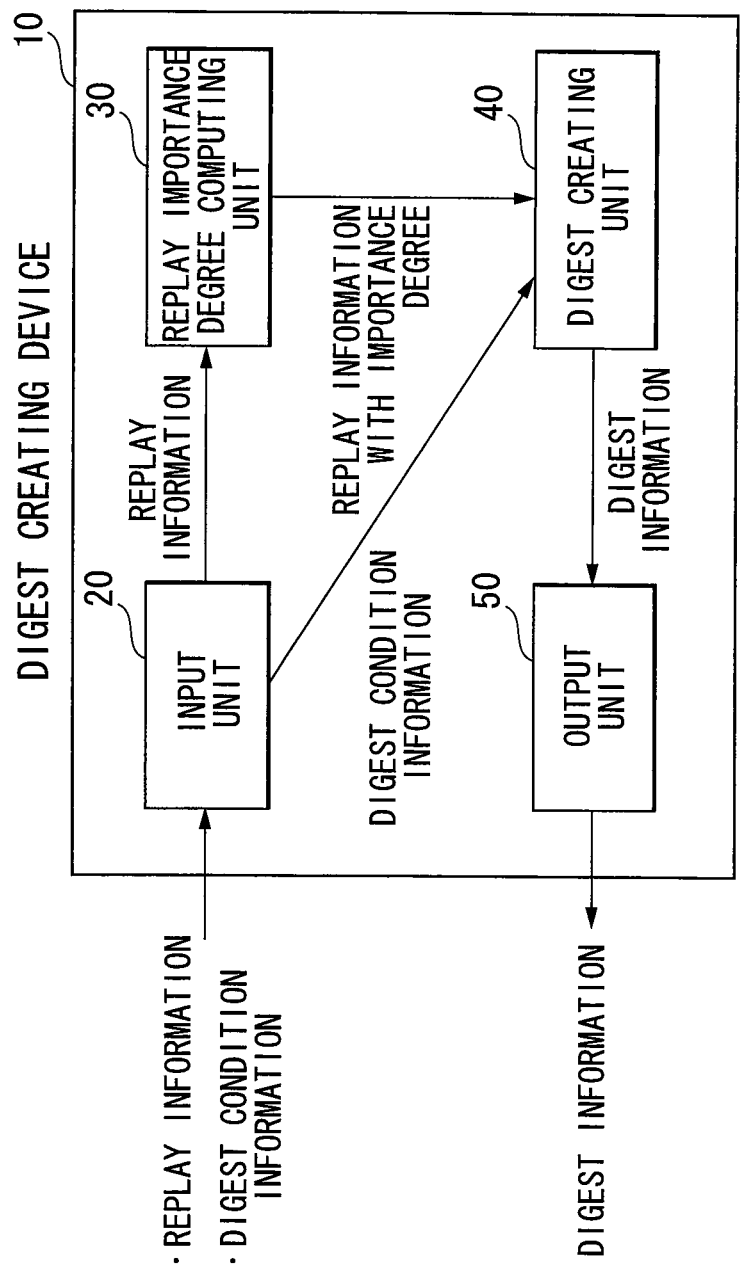
FIG. 6 is a diagram showing information which is input to each unit of the digest creating device in the first embodiment of the present invention.

FIG. 6 shows information to be input or output to/from the respective units of the digest creating device 10. The replay information (FIG. 4) is input from the editing device 70 and the switcher 80 to the input unit 20, and digest condition information to designate the scale of the digest is input to the same. In the case where the digest creating device 10 is located on the broadcast receiving side, the digest condition information is input by an operation of a user who intends to view the contents of a broadcasting game in a digest format. In the case where the digest creating device 10 is located on the broadcast transmitting side, the digest condition information is input by an operation of an editor who intends to provide a digest program in which the game contents are summarized. It should be noted that the editor on the broadcast transmitting side may determine the scale of the digest and transmit the same to the digest creating device on the broadcast receiving side. FIG. 7 shows a data structure of the digest condition information. The input unit 20 outputs the replay information to the replay importance degree computing unit 30, and outputs the digest condition information to the digest creating unit 40.

The replay importance degree computing unit 30 computes the importance degree of each replay information piece, and outputs replay information with an importance degree to the digest creating unit 40. FIG. 8 shows a data structure of the replay information with an importance degree. The digest creating unit 40 selects replay videos to be combined when creating a digest of a designated scale on the basis of the importance degree of each replay information shown in the replay information with an importance degree (FIG. 8) and a designated condition of the digest condition information (FIG. 7), and outputs digest information to the output unit 50. FIG. 9 shows a data structure of the digest information. The output unit 50 outputs the digest information to the outside.

Next, there will be described viewpoints of measuring the importance degree of the replay information.

(a) The number of replays: In the case where the number of replays is "large", it is conceivable that a creator strongly emphasizes the replay, and thus the replay has a high importance degree.

(b) Interval between the replay broadcasting section and the replay reference section: In the case where an interval between the replay broadcasting section start time and the replay reference section start time is "wide", it is conceivable that the scene is the one which a creator wishes to let viewers watch on the basis of the evaluation of the whole game, and thus the scene has a high importance degree.

(c) The length of a replay: In the case where the replay broadcasting section is "long", it is conceivable that the relay is the one to be explained for a longer time, and thus the replay has a high importance degree.

(d) The reproducing speed of a replay: In the case where the reproducing speed is "slow", it is conceivable that the replay is the one to be explained in more detail, and thus the replay has a high importance degree.

(e) The number of cut switches in the replay broadcasting section: In the case where the number of cut switches in the replay broadcasting section is "large" as in the replay 3 in FIGS. 5A and 5B, it is conceivable that the replay is strongly emphasized by utilizing scenes at various angles, and thus the replay has a high importance degree.

Figure 10:
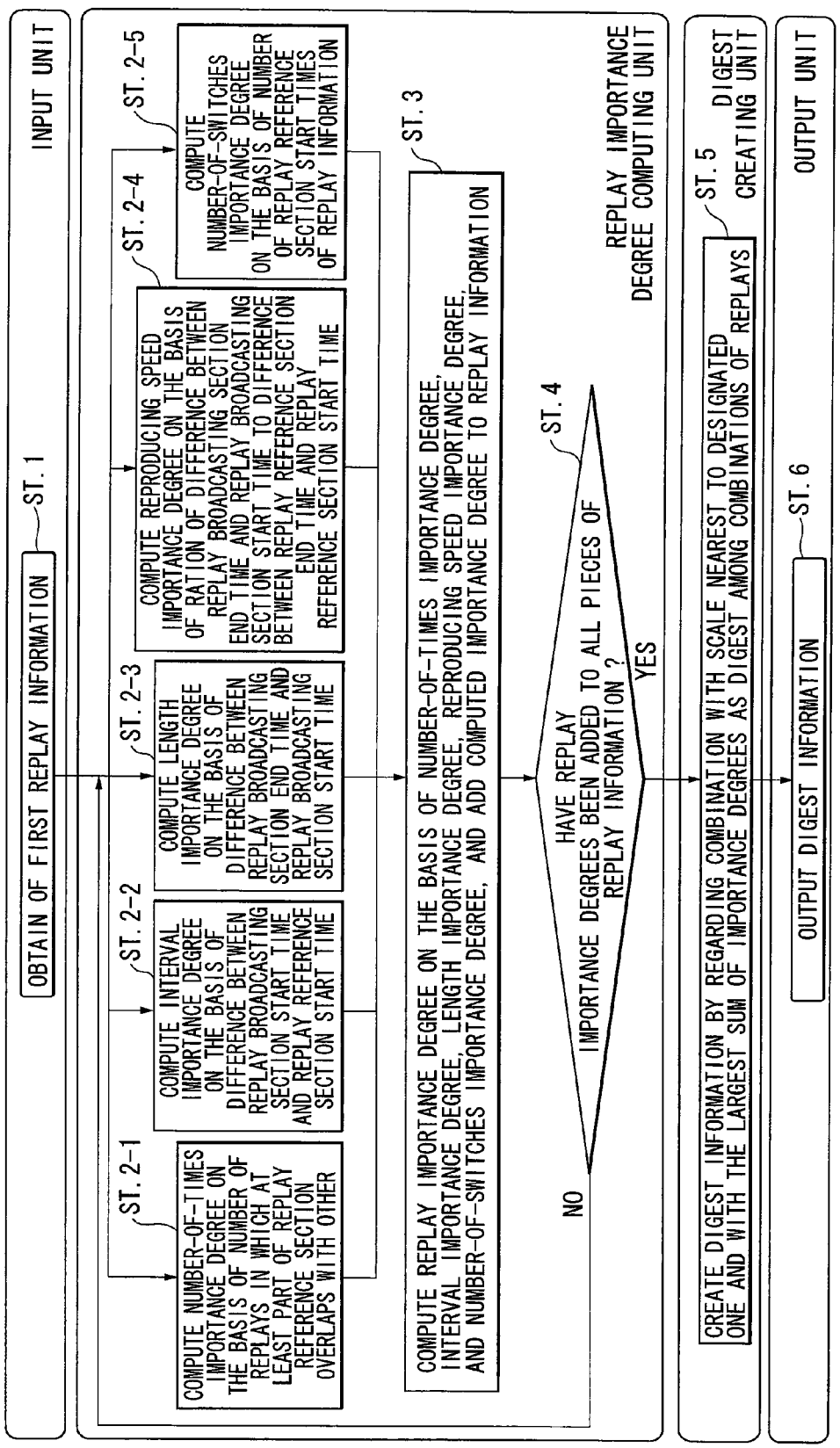
FIG. 10 is a flow diagram showing processing procedures of the digest creating device in the first embodiment of the present invention.

FIG. 10 shows processing procedures of the digest creating device 10. The input unit 20 obtains the replay information (Step 1). The replay importance degree computing unit 30 computes, for the obtained replay information, the importance degree (the-number-of-times importance degree) in view of "(a) the number of replays" on the basis of the number of replays in which at least a part of the replay reference section overlaps with the other (Step 2-1), the importance degree (interval importance degree) in view of "(b) interval between the replay broadcasting section and the replay reference section" on the basis of a difference between the replay broadcasting section start time and the replay reference section start time (Step 2-2), the importance degree (length importance degree) in view of "(c) the length of a replay" on the basis of a difference between the replay broadcasting section end time and the replay broadcasting section start time (Step 2-3), the importance degree (reproducing speed importance degree) in view of "(d) the reproducing speed of a replay" on the basis of a ratio of a difference between the replay broadcasting section end time and the replay broadcasting section start time to a difference between the replay reference section end time and the replay reference section start time (Step 2-4), and the importance degree (the-number-of-switches importance degree) in view of "(e) the number of cut switches in the replay broadcasting section" on the basis of the number of replay reference section start times of the replay information (Step 2-5).

Next, for example, each of the-number-of-times importance degree, the interval importance degree, the length importance degree, the reproducing speed importance degree, and the-number-of-switches importance degree is multiplied by a weighting coefficient α to obtain the sum, and the replay importance degree is accordingly computed to be added to each replay information piece (Step 3). Such processes are repeated until the replay importance degrees are added to all pieces of replay information (Step 4).

Figure 11:
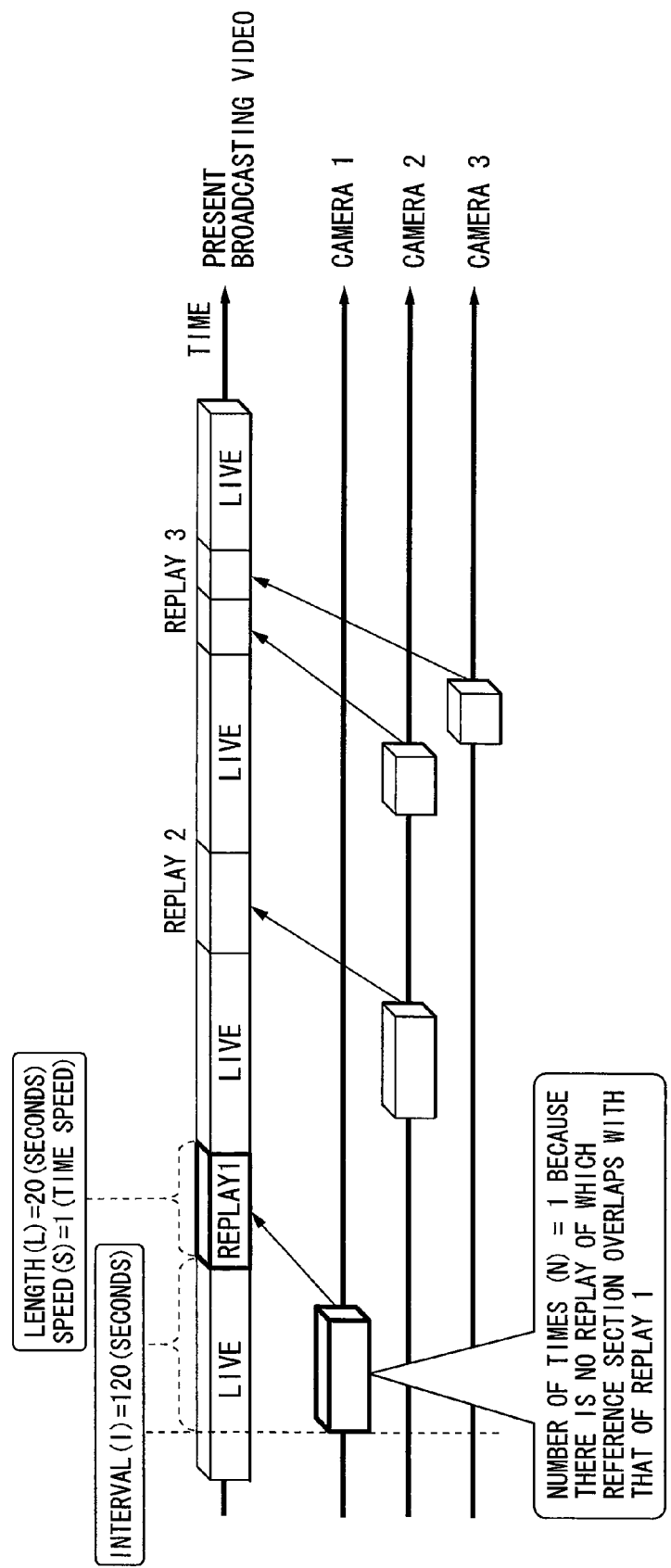
FIG. 11 is a diagram showing a computing method of a replay importance degree in the first embodiment of the present invention.

For example, for replay 1 in FIG. 5, the-number-of-times importance degree is 1 (time), the interval importance degree is 120 (seconds), the length importance degree is 20 (seconds), the reproducing speed importance degree is 1 (time speed), and the-number-of-switches importance degree is 1 (time) as shown in FIG. 11. Therefore, the replay importance degree R1 is obtained as follows.

$$R1 = \alpha1 \cdot (\text{the-number-of-times importance degree}) + \alpha2 \cdot (\text{interval importance degree}) + \alpha3 \cdot (\text{length importance degree}) + \alpha4 \cdot (\text{reproducing speed importance degree}) + \alpha5 \cdot (\text{the-number-of-switches importance degree}) = \alpha1 \cdot 1 + \alpha2 \cdot 120 + \alpha3 \cdot 20 + \alpha4 \cdot 1 + \alpha5 \cdot 1 = 143$$

wherein $\alpha1 = \alpha2 = \alpha3 = \alpha4 = \alpha5 = 1$.

With the same procedures, the importance degree R2 of the replay 2 and the importance degree R3 of the replay 3 are obtained as follows.

$$R2 = 1 + 105 + 15 + 1 + 1 = 123$$

$$R3 = 1 + 50 + 25 + 1 + 2 = 79$$

The replay importance degree computing unit 30 creates the replay information with an importance degree by adding the importance degree thus obtained to each replay information, and outputs the same to the digest creating unit 40.

Among combinations of replays, the digest creating unit 40 selects a combination of replays with a scale nearest to the one designated in the digest condition information and with the largest sum of the importance degrees, and creates the digest information (Step 5).

Figure 12:
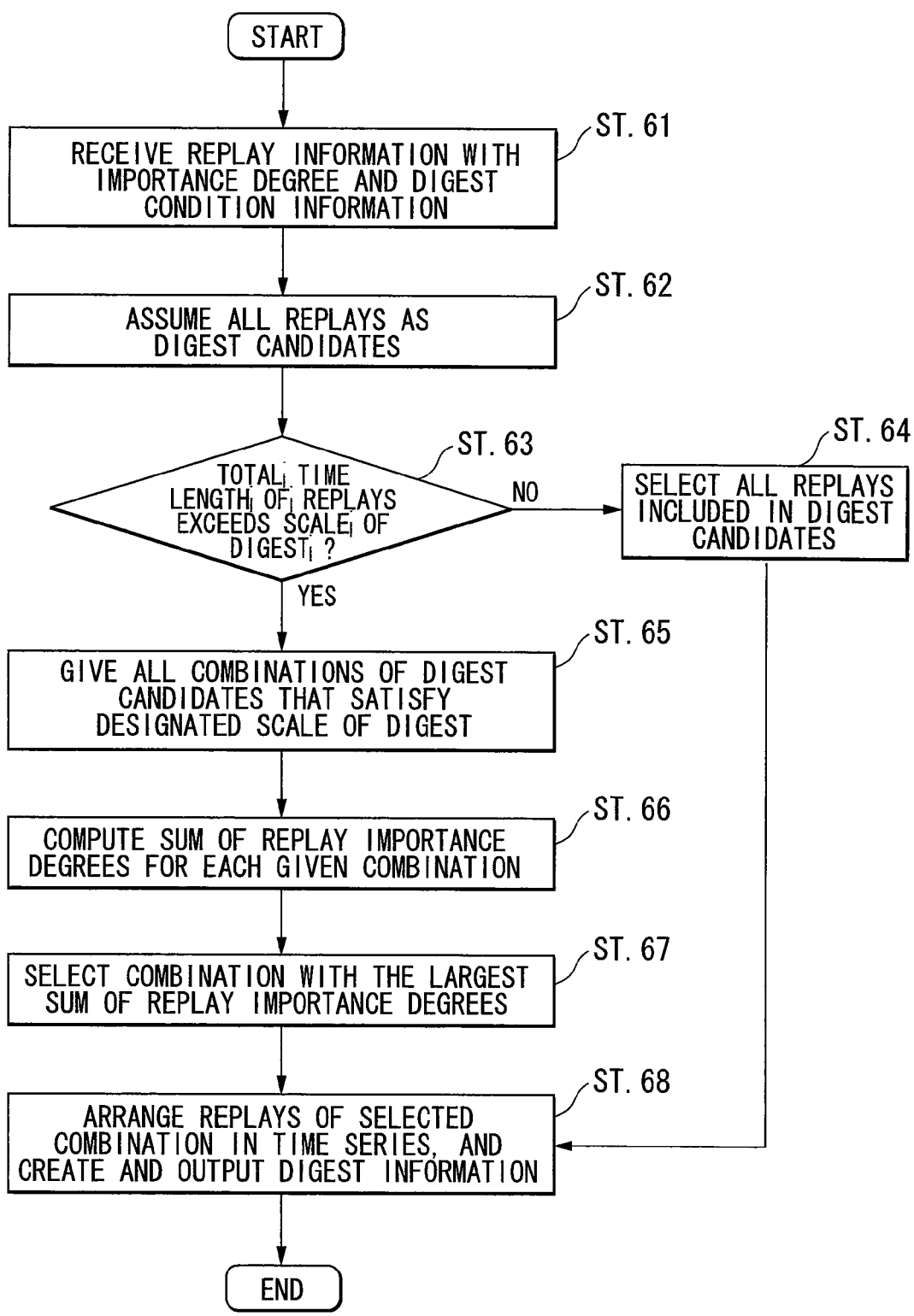
FIG. 12 is a flow diagram showing processing procedures of a digest creating unit in the first embodiment of the present invention.

The detailed procedures in the digest creating unit 40 at this time are shown in FIG. 12. The digest creating unit 40 receives the replay information with an importance degree and the digest condition information (Step 61), and executes the following processes assuming all the replays as digest candidates (elements for combination when creating the digest) (Step 62).

First, it is determined whether or not the total time length of the replays of the digest candidates exceeds the designated scale of a digest (Step 63). If exceeding, all combinations of the digest candidates that can satisfy the designated scale of the digest are given (Step 65), the sum of the replay importance degrees is computed for each given combination (Step 66), a combination of replays in which the sum of the replay importance degrees is the largest is selected (Step 67), and the replays of the selected combination are arranged in time series to create the digest information (Step 68). On the other hand, if the total time length of the replays of the digest candidates does not exceed the designated scale of the digest in Step 63, all the replays included in the digest candidates are selected (Step 64) and Step 68 is processed.

In the case of FIGS. 5A and 5B, if it is assumed that the scale of the digest designated in the digest condition information is 40 seconds, five combinations of replays within 40 seconds are given: "replay 1 only", "replay 2 only", "replay 3 only", "replay 1+replay 2", and "replay 2+replay 3". The sums of the respective importance degrees of the replays are as follows.

"replay 1 only": 143
"replay 2 only": 123
"replay 3 only": 79
"replay 1+replay 2": 266
"replay 2+replay 3": 211

As a result, "replay 1+replay 2" with the largest sum of the replay importance degrees is selected, and the replays are arranged in time series to create the digest information.

The output unit 50 of the digest creating device 10 outputs the digest information created by the digest creating unit 40 (Step 6). In accordance with the digest information (FIG. 9), only replay videos between the replay broadcasting section start time and the replay broadcasting section end time designated in the digest information are sequentially displayed among accumulated present-broadcasting-video, and accordingly a digest that satisfies the designated scale can be displayed.

As described above, in the digest creating method, a digest with a designated scale can be created by utilizing only easily-available history information (timing of the queue operation, switching information of a switch and the like) of a broadcasting device.

It should be noted that the replay information may be provided while being multiplexed to the present broadcasting video, all pieces of replay information may be collected for provision after the end of a game, or the replay information of the replay videos included within a certain period may be collected for periodic provision. Alternatively, the weighting coefficient for computing the importance degrees may be changed depending on the kind of a broadcast (sport program, news program, and the like) and a preference of a viewer.

In the first embodiment, there has been described the case that the importance degrees are computed by utilizing the replays broadcasted in the same game by the same broadcasting station, that is, the replays used in a broadcasting program, but the present invention is not limited thereto. There may be a case that replays that were used once in another channel (including multi-channel) or another game are referred to. For example, the replays are referred to in a news program, a sport program, and the like. In such a case, the importance degrees may be added to the replays. Thereby, the replays used in a program other than the broadcasting program can be utilized in a digest.

The digest creating device according to the first embodiment may be installed in a receiving terminal on the receiving station side to be used for creating the digest information with which a viewer views a digest. Alternatively, the digest creating device may be installed in a center device on the broadcasting station side to output the digest information to be used for creating a digest program in which the contents of a game is summarized, or to output the digest information to be provided to the receiving terminal through broadcasting. The replay information and the digest condition information can be obtained through "broadcasting", "delivery", "network" and the like.

It is also possible to include a function block of a part of the digest creating device in the center device and to include the other function blocks in the receiving terminal. For example, the replay importance degree computing unit 30 and the digest creating unit 40 may be installed in the center device, the replay importance degree computing unit 30 may be installed in the center device and the digest creating unit 40 may be installed in the receiving terminal, or the replay importance degree computing unit 30 and the digest creating unit 40 may be installed in the receiving terminal. In any case, the digest information that satisfies the digest condition information to be set on the center device side or receiving terminal side can be created. Further, a load of the digest creating process can be shared between the center device and the receiving terminal, or the digest information to which a preference of a user is added can be created. In the case where the digest information is created in the center device, or the replay information with an importance degree and the like are created in the center device, the respective pieces of information may be managed in a database (not shown), and two-way communications may be performed between the center device and the receiving terminal to obtain the respective pieces of information managed in the database. Thereby, the digest creating process can be effectively performed between the center device and the receiving terminal.

Second Embodiment

In a digest creating method according to the second embodiment, the quality of a digest is enhanced in such a manner that replay videos in which the replay reference sections do not overlap with each other are taken in the digest.

Figure 14:
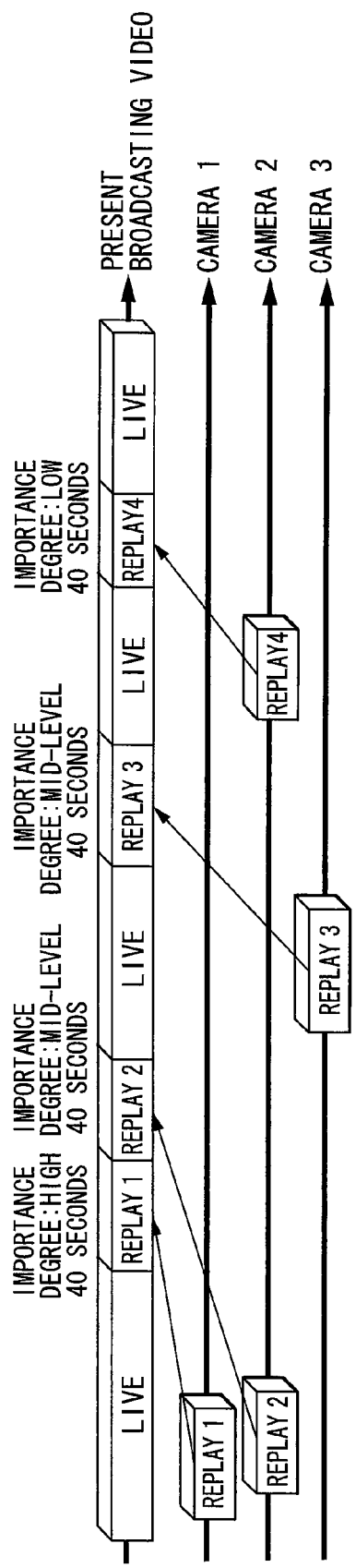
FIG. 14 is a diagram explaining a digest creating method in a second embodiment of the present invention.

As shown in FIG. 14, in the case where replays 1 to 4 are inserted into the present broadcasting video, computing of the importance degrees shows that "replay 1+replay 2+replay 3" is higher than "replay 1+replay 3+replay 4". However, "replay 1+replay 2+replay 3" includes "replay 1" and "replay 2" in which the replay reference sections overlap with each other. On the other hand, "replay 1+replay 3+replay 4" does not include any replays (that is, videos of the same contents) in which the replay reference sections overlap with each other. Therefore, "replay 1+replay 3+replay 4" contains the amount of information larger than "replay 1+replay 2+replay 3". Thus, in this case, the quality of the digest is improved by selecting "replay 1+replay 3+replay 4".

The configuration of the digest creating device that executes the method is the same as that in the first embodiment (FIG. 1 and FIG. 6). The replay importance degree computing unit 30 computes the importance degree of each replay by the same processes as those in the first embodiment to output the replay information with an importance degree to the digest creating unit 40.

Figure 15:
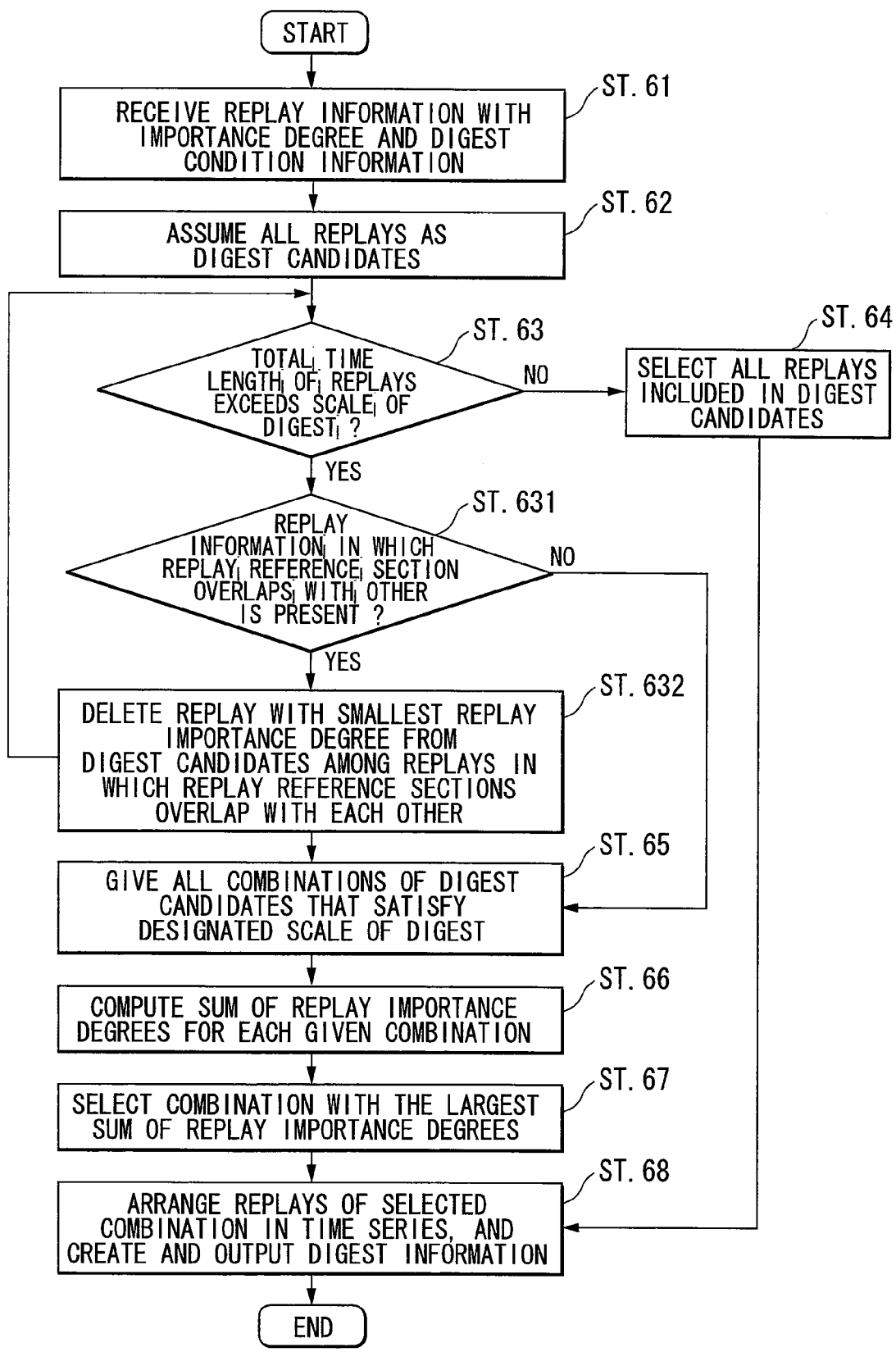
FIG. 15 is a flow diagram showing processing procedures of a digest creating unit in the second embodiment of the present invention.

The digest creating unit 40 creates the digest information with procedures shown in FIG. 15. The digest creating unit 40 receives the digest information with an importance degree and the digest condition information (Step 61), all the replays are assumed as digest candidates (Step 62), and it is determined whether or not the total time length of the replays of the digest candidates exceeds the designated scale of the digest (Step 63). If exceeding, it is checked whether or not there are any pieces of replay information in which the replay reference sections overlap with each other (Step 631). If existing, the replay information with the smallest replay importance degree is deleted from the digest candidates (Step 632).

Processes to be executed thereafter are the same as those in the first embodiment. All combinations of the digest candidates that satisfy the designated scale of the digest are given (Step 65), the sum of the replay importance degrees is computed for each combination (Step 66), a combination of replays in which the sum of the replay importance degrees is the largest is selected (Step 67), and the replays of the selected combination are arranged in time series to create the digest information (Step 68). If the total time length of the replays of the digest candidates does not exceed the designated scale of the digest in Step 63, all the replays are selected (Step 64) to execute the process of Step FIGS. 16A to 16F illustrate processing procedures when the scale of the digest is designated as 110 seconds in the case of FIG. 14.

(a) The total time length of the replays when assuming all the replays as digest candidates is 160 seconds, which exceeds 110 seconds.
(b) At this time, the replays in which the replay reference sections overlap with each other are detected. The replay 1 and the replay 2 are ones in which the replay reference sections overlap with each other, and thus the replay 2 with the smallest replay importance degree is deleted from the digest candidates.
(c) As a result, the digest candidates are narrowed down to the replay 1, the replay 3, and the replay 4, however, the total time length thereof is 120 seconds, which exceeds the designated scale (110 seconds).
(d) Therefore, (since there are no replays in which the replay reference sections overlap with each other,) combinations in which the total time length does not exceed 110 seconds are given among the targets of the replay 1, replay 3, and replay 4 to compute the sum of the replay importance degrees.
(e) The largest sum of the importance degrees among these combinations is the combination of the replay 1+the replay 3.
(f) The combination of the replay 1+the replay 3 is selected, and the replay 1 and the replay 3 are arranged in time series so as to be the final digest.

As described above, the amount of information of the digest can be enhanced in the second embodiment by selecting only one digest candidate among the replays in which the replay reference sections overlap with each other.

Third Embodiment

In a sport broadcast, previous highlight scenes are often replayed. In a digest creating method according to the third embodiment of the present invention, the quality of a digest is improved by giving a high evaluation to the highlight. The highlights are collections of replays which are considered as important throughout a game, and a state of highlight is reflected to the digest creation, thus improving the quality of the digest.

Figure 17:
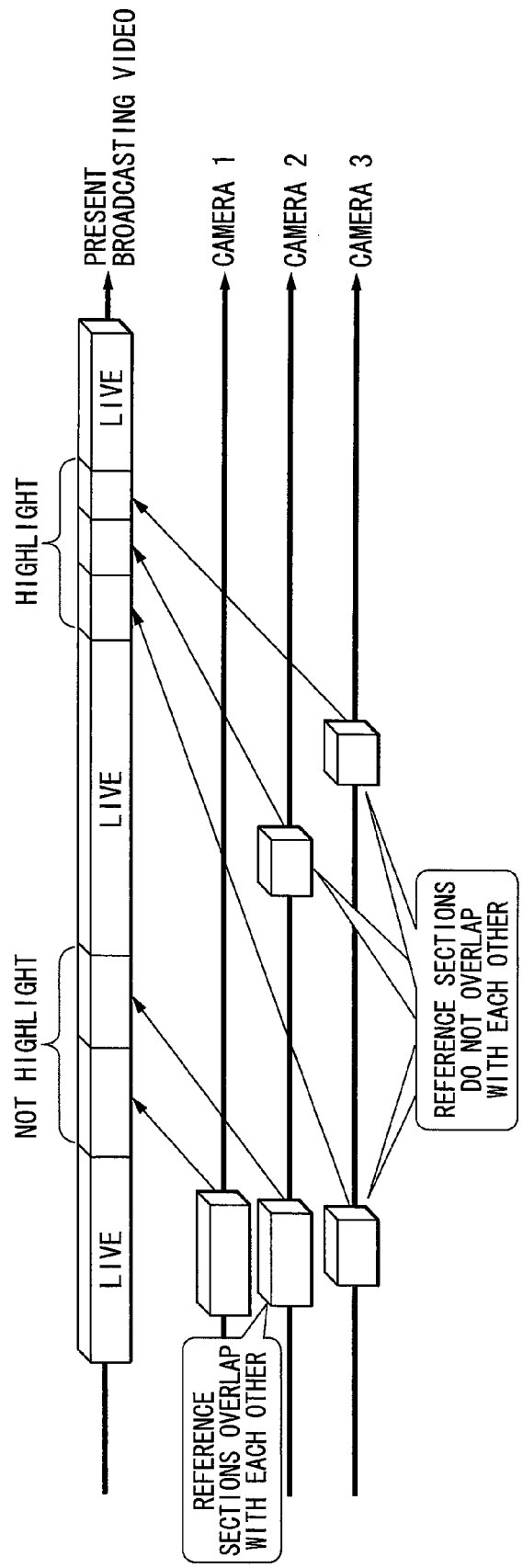
FIG. 17 is a diagram explaining a digest creating method in a third embodiment of the present invention.

FIG. 17 shows a difference between the highlight and normal replays. The highlight is composed of a plurality of replays in which the replay broadcasting sections are arranged in series and the replay reference sections do not overlap with each other. The case where the replay broadcasting sections are arranged in series and the replay reference sections overlap with each other is considered as the normal replays, not the highlight.

The configuration of a device that executes the digest creating method is the same as that in the first embodiment (FIG. 1 and FIG. 6). However, a different point is that by paying attention to a highlight as one of the viewpoints in which the importance degree of the replay information is measured, the replay importance degree computing unit 30 adds an importance degree (highlight importance degree) to the highlight.

Figure 18:
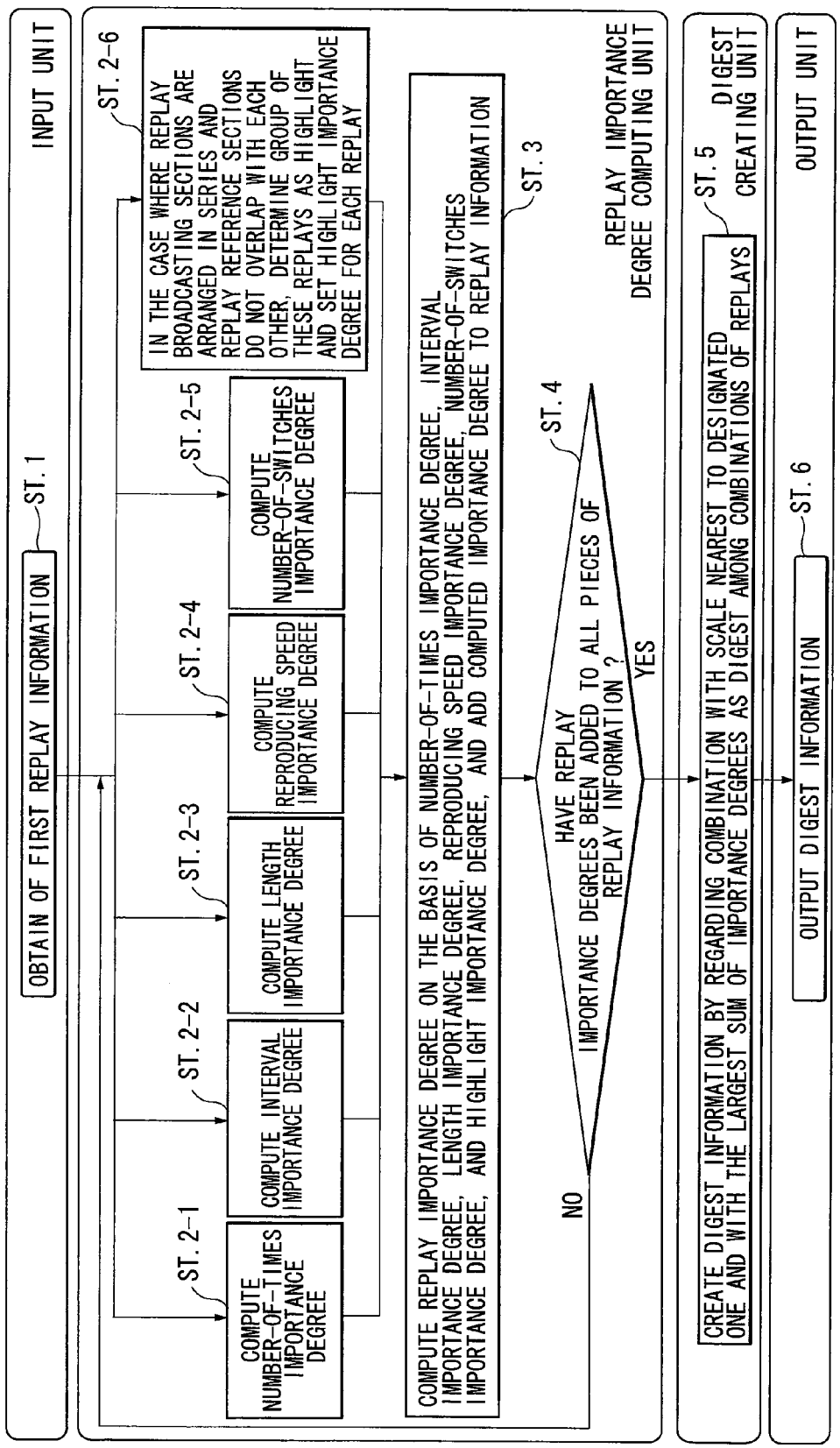
FIG. 18 is a flow diagram showing processing procedures of a digest creating device in the third embodiment of the present invention.

FIG. 18 shows processing procedures of the digest creating device 10 including processes of the replay importance degree computing unit 30. For the replay information transmitted from the input unit 20, the replay importance degree computing unit 30 computes the-number-of-times importance degree (Step 2-1), the interval importance degree (Step 2-2), the length importance degree (Step 2-3), the reproducing speed importance degree (Step 2-4), and the-number-of-switches importance degree (Step 2-5). At the same time, in the case where the replay broadcasting sections are arranged in series and the replay reference sections do not overlap with each other, the replay importance degree computing unit 30 determines a group of these replays as a highlight, a highlight importance degree is set to each replay (Step 2-6).

Next, the replay importance degree is computed from the-number-of-times importance degree, the interval importance degree, the length importance degree, the reproducing speed importance degree, the-number-of-switches importance degree, and the highlight importance degree, and the computed degree is added to the replay information (Step 3). Such processes are repeated until the replay importance degrees are added to all pieces of replay information (Step 4). Operations of the digest creating unit 40 that received the replay information with an importance degree from the replay importance degree computing unit 30 are the same as those in the first embodiment.

Figure 19:
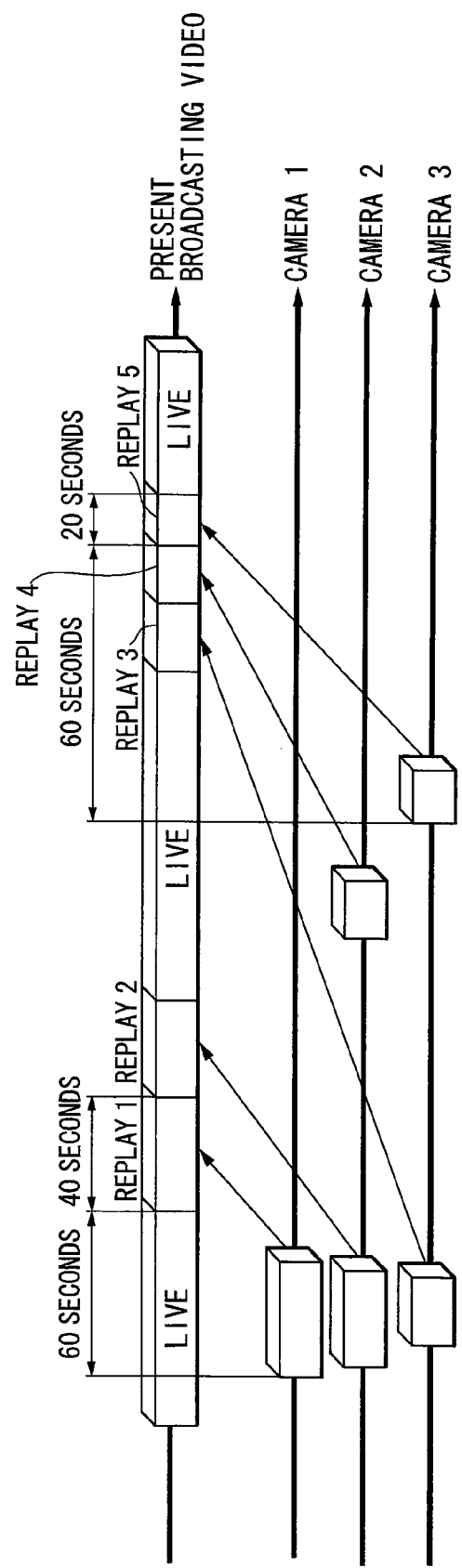
FIG. 19 is a diagram showing an example of computing an importance degree in the digest creating method in the third embodiment of the present invention.

In the case of the replays 1 to 5 shown in FIG. 19, it is determined whether or not each replay is of a highlight in addition to the number of times, the interval, the length, the reproducing speed, and the number of switches. In the replay 1 and replay 2, the replay broadcasting sections are arranged in series, but the replay reference sections overlap with each other, and thus the replay 1 and replay 2 are not determined as highlight. On the other hand, in the replay 3, the replay 4 and the replay 5, the replay broadcasting sections are arranged in series and the replay reference sections do not overlap with each other, and thus the replay 3, the replay 4 and the replay 5 are determined as highlight. Therefore, the highlight importance degree is set to each of the replay 3, the replay 4 and the replay 5. The following is the comparison of the importance degree of the replay 1 with that of the replay 5.

> Importance degree of replay 1=the-number-of-times importance degree+interval importance degree+ length importance degree+reproducing speed importance degree+the-number-of-switches importance degree=1+60+40+1+1 =103

> Importance degree of replay 5=the-number-of-times importance degree+interval importance degree+ length importance degree+reproducing speed importance degree+the-number-of-switches importance degree+highlight importance degree=1+60+20+1+1+30=113

As described above, in the third embodiment, by increasing the replay importance degrees of the replay videos in the highlight broadcasting section, it is possible to take a highlight video determined as important by a creator of a program in a digest.

Fourth Embodiment

Figure 20:
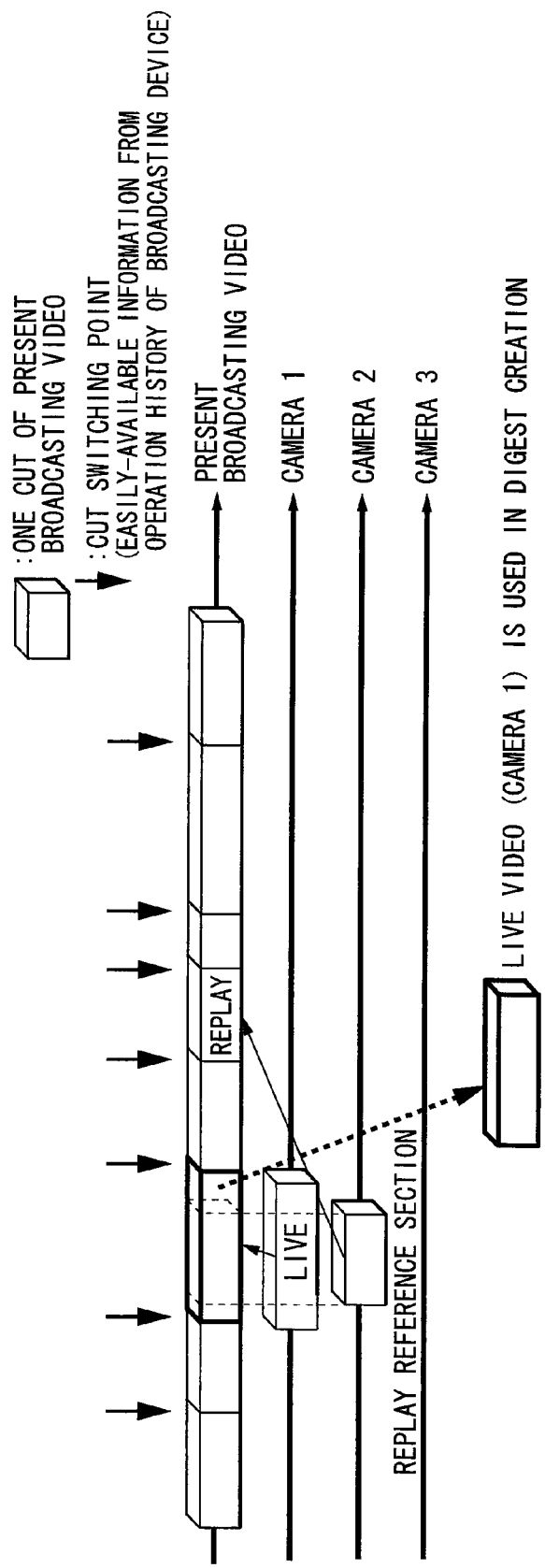
FIG. 20 is a diagram explaining a digest creating method in a fourth embodiment of the present invention.

In the fourth embodiment of the present invention, there will be described a digest creating method using videos other than replay videos. In this method, information of a cut switching point of a live video is obtained together with the replay information, and a cut (that is, a live video in a time zone where the replay video is actually filmed) of the live video including the replay reference section is used in a digest as shown in FIG. 20, instead of using the replay video in a digest.

The configuration of a digest creating device that executes the method is the same as that in the first embodiment (FIG. 1 and FIG. 6). However, a different point is that information of a cut switching point of a live video which can be obtained using a operation history of a broadcasting device is input to the input unit 20 together with the replay information, and the digest creating unit 40 specifies a cut (that may be plural) of a live video including the replay reference section on the basis of information of the replay reference section included in the replay information with an importance degree and information of the cut switching point, and creates the digest information by regarding the cut as a digest candidate to which the importance degree is added.

In the case where scene information (information for representing a meaningful video segment) is supplied to the input unit 20 together with the replay information, a scene of the live video including the replay reference section may be used in the digest, instead of using the replay video in the digest.

Figure 21:
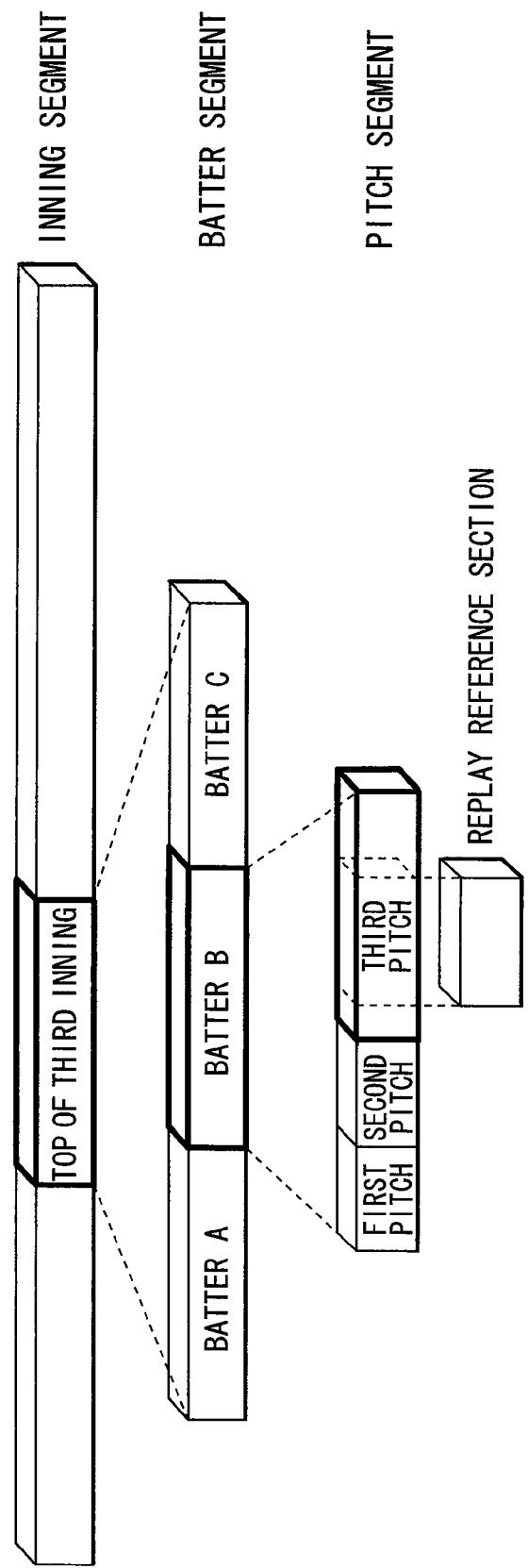
FIG. 21 is a diagram explaining the digest creating method in the fourth embodiment of the present invention.

For example, as shown in FIG. 21, in the case where scene information for representing an inning segment, scene information for representing a batter segment and scene information for representing a pitch segment are given, a scene of an inning including the replay reference section may be a digest candidate, a scene of a batter including the replay reference section may be a digest candidate, or a scene of a pitch including the replay reference section may be a digest candidate. Further, the size of the scene segment may be changed depending on the replay importance degree in such a manner that when the replay importance degree is high, a scene of an inning is set as a digest candidate, or when the replay importance degree is low, a scene of a pitch is set as a digest candidate.

Figure 22:
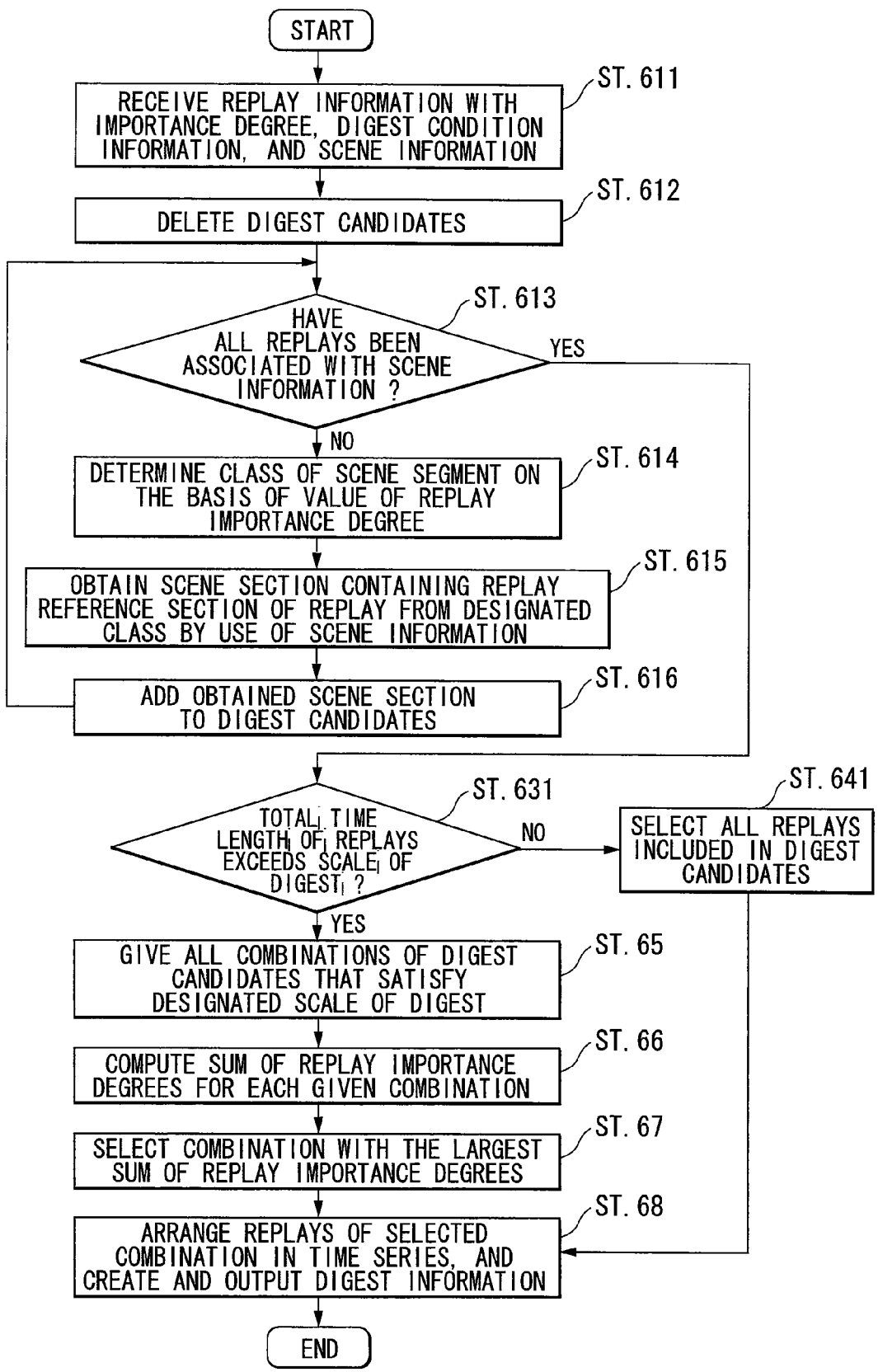
FIG. 22 is a flow diagram showing processing procedures of a digest creating unit in the fourth embodiment of the present invention.

FIG. 22 shows processing procedures in the digest creating unit 40 in this case. When the digest creating unit 40 receives the replay information with an importance degree, the digest condition information, and the scene information (Step 611), the digest candidates are deleted and the flowing processes are executed (Step 612). A class with which a scene is segmented is determined on the basis of the value of the replay importance degree (Step 614), a scene section containing the replay reference section of the replay is obtained from the designated class by use of the scene information (Step 615), and the obtained scene section is added to the digest candidates (Step 616).

When these processes are repeated for all the replays, and the association of all the replays with the scene information is completed (Step 613), it is determined whether or not the total time length of the scene sections of the digest candidates exceeds the designated scale of the digest (Step 631). If exceeding, all combinations of the digest candidates that satisfy the designated scale of the digest are given (Step 65) the sum of the replay importance degrees is computed for each combination (Step 66), a combination of replays in which the sum of the replay importance degrees is the largest is selected (Step 67), and the scene sections of the selected combination are arranged in time series to create the digest information (Step 681). If the total time length of all the scene sections does not exceed the designated scale of the digest in Step 631, all the scene sections are selected (Step 641) to execute the process of Step 681.

Figure 23:
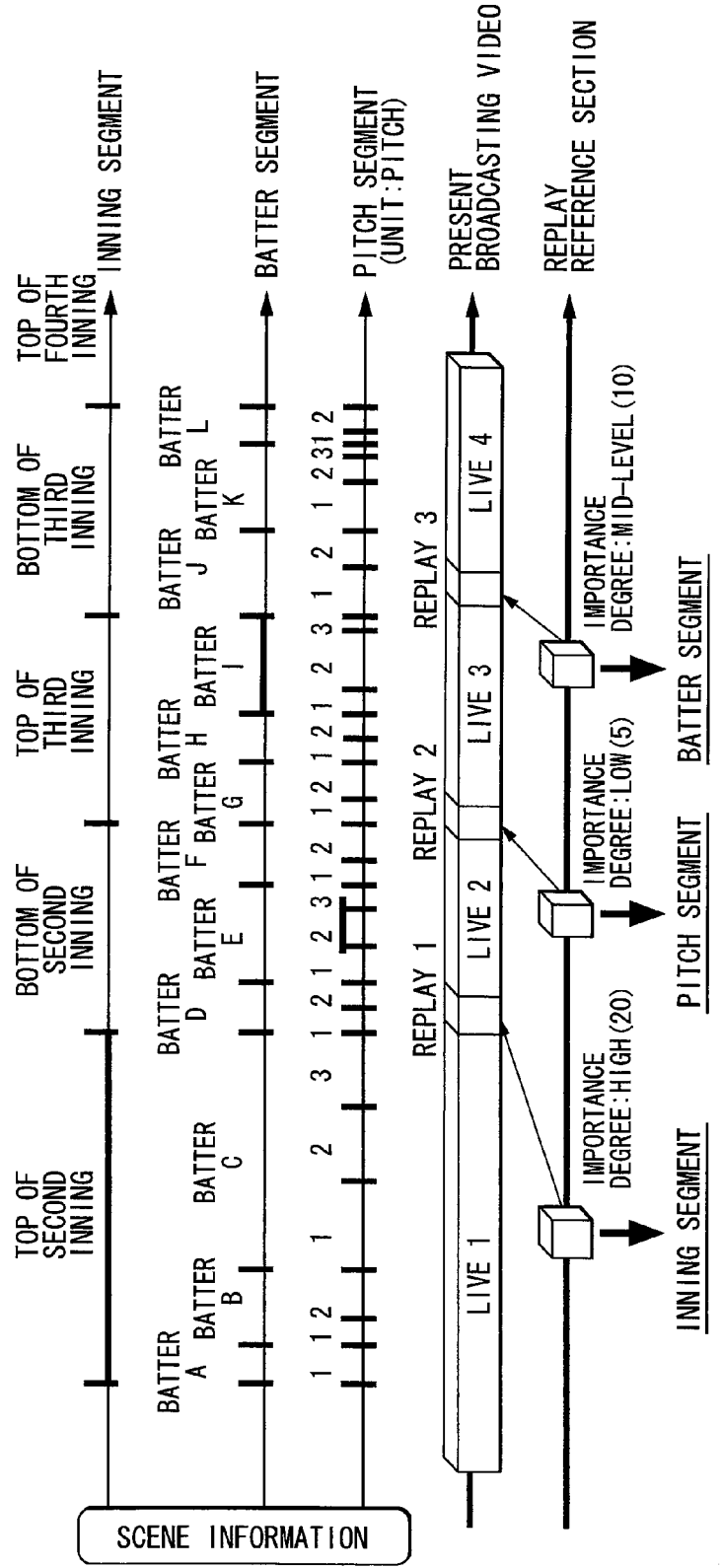
FIG. 23 is a diagram explaining a method of determining a segment class in the fourth embodiment of the present invention.

FIG. 23 and FIG. 24 illustrate processes in this case. For a unit (class) of a scene segment, the replay 1 with a high importance degree is determined as "inning segment", the replay 2 with a low importance degree is determined as "pitch segment", and the replay 3 with a mid-level importance degree is determined as "batter segment". "Inning segment" containing the reference section of the replay 1, "pitch segment" containing the reference section of the replay 2, and "batter segment" containing the reference section of the replay 3 are obtained from the scene information, and these are regarded as digest candidates. FIGS. 24A1, 24A2, and 24A3 show the scene of the digest candidate associated with the replay 1, the scene of the digest candidate associated with the replay 3, the scene of the digest candidate associated with the replay 2, respectively.

In the case where the scale of the digest is designated as 160 seconds, all combinations of the digest candidates within 160 seconds are obtained by use of three digest candidates, and one of the combinations in which the sum of the importance degrees is the largest is selected. In this case, the combination shown in FIG. 24B is selected. In fact, the digest viewed by use of the digest information is broadcasted like a part (a part of Live 1) of the present broadcasting video associated with the scene section of "the top of the second inning" and a part of the present broadcasting video (a part of Live 3) associated with "batter 1".

As described above, in the fourth embodiment, under what circumstances a play displayed in the replay video happened is easily recognized by use of a cut or a scene of the present broadcasting video containing the replay reference section in the digest and thus the quality of the digest can be improved.

Although the above-described matters are used for time segments of scenes, the video to be used as a digest may use one other than the present broadcasting video (a video filmed by another camera used in other than the present broadcasting). In this case, one scene section is associated with one replay and a digest is created by use of only the scene section, however, the present invention is not necessarily limited thereto. A digest may be created by combining both the replay and the scene section.

Fifth Embodiment

As apparent from the above-described embodiments, the computing of the importance degree of each replay information is roughly divided into two steps. That is, after computing the importance degrees of the number of replays, an interval, a time length, broadcasting speed, the number of cut switches and the like, the importance degree of the replay information is computed. In a digest creating method according to the fifth embodiment of the present invention, a method of creating a digest is explained by dividing the configuration of the replay importance degree computing unit 30 shown in the first embodiment into a first replay importance degree computing unit 31 in a center device 100 installed on the broadcasting station side and a second replay importance degree computing unit 32 in a receiving terminal 200 installed on the receiving station side.

As shown in FIG. 25, the center device 100 includes the input unit 20 to which first replay information is input from the editing device 70 and the switcher 80 (FIG. 1), the first replay importance degree computing unit 31 which obtains the first replay information, computes the-number-of-times importance degree, the interval importance degree, the length importance degree, the reproducing speed importance degree, the-number-of-switches importance degree and the like by use of the first replay information, and creates second replay information in which each importance degree is associated with the first replay information.

FIG. 26 shows a data structure of the first replay information to be input to the input unit 20. The first replay information contains information of the replay broadcasting section start time, the replay broadcasting section end time, the replay reference section start time, the replay reference section end time, and the filming camera number, in addition to the replay number to designate each replay. It should be noted that the data structure of the first replay information in the fifth embodiment is the same as that of the replay information shown in the first embodiment.

FIG. 27 shows a data structure of the second replay information created by the first replay importance degree computing unit 31. In the second replay information, the-number-of-times importance degree, the interval importance degree, the length importance degree, the reproducing speed importance degree, the-number-of-switches importance degree and the like that are computed on the basis of each piece of information shown in the first replay information are associated with the first replay information. For example, in the case of the replay 1 in FIGS. 5A and 5B, as shown in FIG. 11, the-number-of-times importance degree is 1 (time), the interval importance degree is 120 (seconds), the length importance degree is 20 (seconds), the reproducing speed importance degree 1 (time speed), and the-number-of-switches importance degree is 1 (time), and each importance degree is associated with the first replay information in the second replay information.

On the other hand, the receiving terminal 200 includes: the second replay importance degree computing unit 32 which obtains the second replay information transmitted from the center device 100, computes the importance degree of the replay information by adjusting each importance degree shown in the second replay information on the basis of a weighting coefficient managed in a weighting rule setting database 60, and outputs the replay information with an importance degree; the digest creating unit 40 which obtains the replay information with an importance degree and the digest condition information (the scale of a digest) to be input by an operation of a user, selects the replay information with a high importance degree in accordance with the scale of the digest, and creates the digest information; and the output unit 50 which outputs the created digest information. Each computer incorporated in the device 100 and the terminal 200 executes a program for specifying operations so that the first replay importance degree computing unit 31 of the center device 100, and the second replay importance degree computing unit 32 and the digest creating unit 40 of the receiving terminal 200 are realized.

Figure 29:
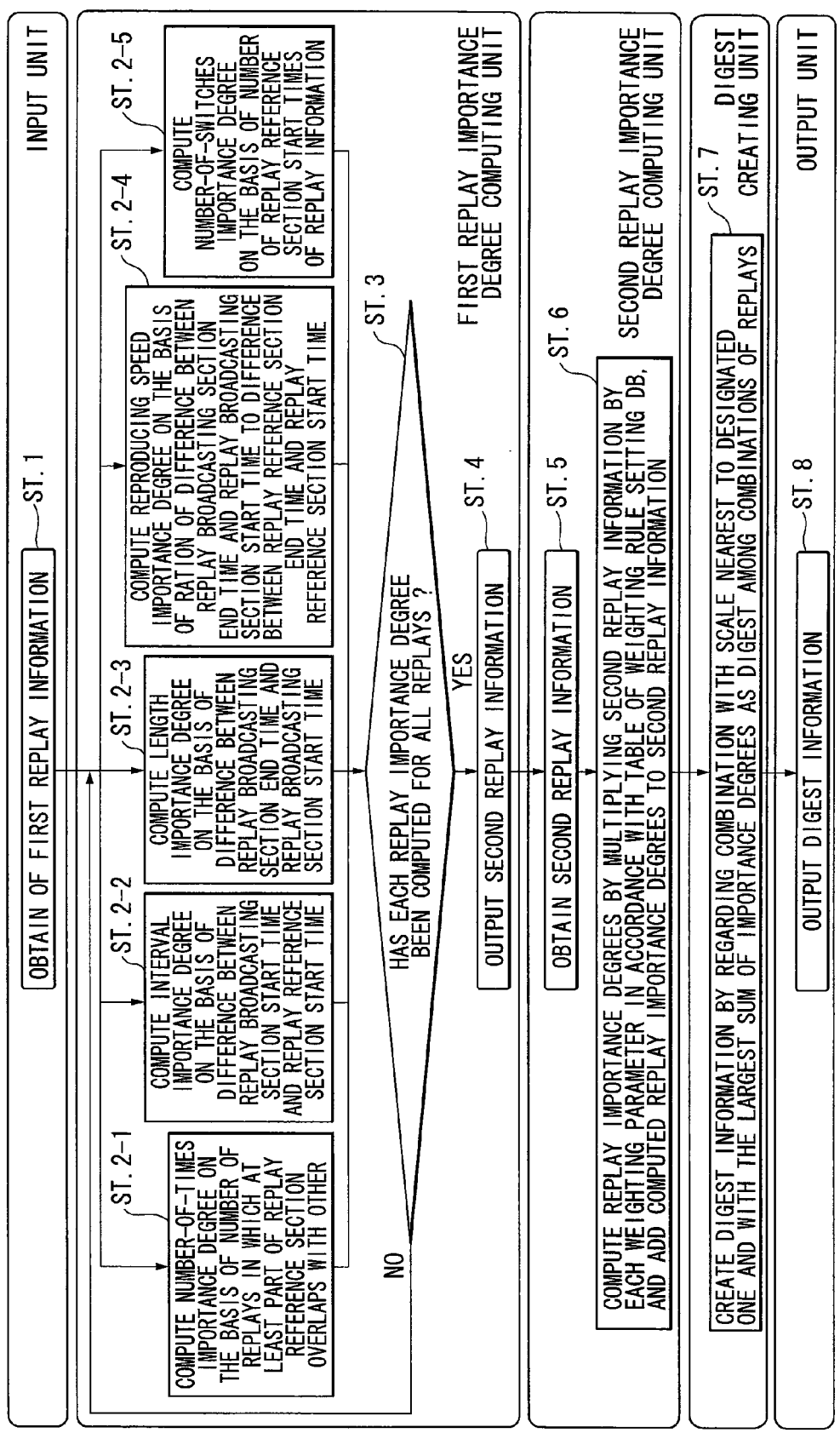
FIG. 29 is a flow diagram showing processing procedures of the digest creating device in the fifth embodiment of the present invention.

FIG. 29 shows processing procedures from the time when the center device 100 obtains the first replay information to the time when the receiving terminal 200 outputs the digest information. The input unit 20 of the center device 100 obtains the first replay information (Step 1). The first replay importance degree computing unit 31 computes, for the first replay information, the importance degree (the-number-of-times importance degree) in view of "(a) the number of replays" on the basis of the number of replays in which at least a part of the replay reference section overlaps with the other (Step 2-1), the importance degree (interval importance degree) in view of "(b) interval between the replay broadcasting section and the replay reference section" on the basis of a difference between the replay broadcasting section start time and the replay reference section start time (Step 2-2), the importance degree (length importance degree) in view of "(c) the length of a replay" on the basis of a difference between the replay broadcasting section end time and the replay broadcasting section start time (Step 2-3), the importance degree (reproducing speed importance degree) in view of "(d) the reproducing speed of a replay" on the basis of a ratio of a difference between the replay broadcasting section end time and the replay broadcasting section start time to a difference between the replay reference section end time and the replay reference section start time (Step 2-4), and the importance degree (the-number-of-switches importance degree) in view of "(e) the number of cut switches in the replay broadcasting section" on the basis of the number of replay reference section start times of the replay information (Step 2-5).

The first replay importance degree computing unit 31 repeats such processes until each importance degree is computed for all pieces of replay information (Step 3). In the case where the processes are finished, the second replay information is transmitted to the second replay importance degree computing unit 32 of the receiving terminal 200 (Step 4).

The second replay importance degree computing unit 32 obtains the second replay information transmitted from the first replay importance degree computing unit 31 of the center device 100 (Step 5). In accordance therewith, the second replay importance degree computing unit 32 obtains a weighting rule setting table (FIG. 30) managed for each genre from the weighting rule setting database 70, and adjusts each importance degree shown in the second replay information on the basis of weighting coefficients shown in the table.

For example, in the case where the input first replay information shows the baseball, the weighting coefficients for the-number-of-times importance degree, the interval importance degree, the length importance degree, the reproducing speed importance degree, the-number-of-switches importance degree are $\alpha 1=1.5$, $\alpha 2=1.5$, $\alpha 3=1$, $\alpha 4=0.5$, $\alpha 5=1$, respectively, as shown in FIG. 30. Therefore, the importance degree R1 of the replay 1 in FIGS. 5A and 5B is obtained as follows.

$$R1 = \alpha 1 \cdot (\text{the-number-of-times importance degree}) +$$
$$\alpha 2 \cdot (\text{interval importance degree}) + \alpha 3 \cdot (\text{length importance degree}) +$$
$$\alpha 4 \cdot (\text{reproducing speed importance degree}) +$$
$$\alpha 5 \cdot (\text{the-number-of-switches importance degree}) =$$
$$1.5 \cdot 1 + 1.5 \cdot 120 + 1 \cdot 20 + 0.5 \cdot 1 + 1 \cdot 1 = 203$$

With the same procedures, the importance degree R2 of the replay 2 and the importance degree R3 of the replay 3 in FIG. 5 are obtained as follows.

$$R2 = 1.5 \cdot 1 + 1.5 \cdot 105 + 1 \cdot 15 + 0.5 \cdot 1 + 1 \cdot 1 = 175.5$$
$$R3 = 1.5 \cdot 1 + 1.5 \cdot 50 + 1 \cdot 25 + 0.5 \cdot 1 + 1 \cdot 2 = 104$$

The second replay importance degree computing unit 32 creates the replay information with an importance degree (FIG. 28) by adding the importance degrees thus obtained to the second replay information, and outputs the same to the digest creating unit 40 (Step 6).

It should be noted that the values of the weighting coefficients shown in the weighting rule setting table may be set by any one on the broadcasting station side or the receiving station side. If a person on the broadcasting station side sets the values, a digest with the same trend can be provided to users. On the other hand, if a person on the receiving station side sets the values, a digest to which a preference of a user is added can be created. Further, the values of the weighting coefficients may be updated so that a digest favorable for the broadcasting station side or the receiving station side can be created.

Among combinations of the obtained pieces of replay information with an importance degree, the digest creating unit 40 selects a combination with a scale nearest to the one designated in the digest condition information input by an operation of a user and with the largest sum of the importance degrees, and creates the digest information (Step 7). The detailed procedures in the digest creating unit 40 at this time are the same as those shown in FIG. 12 and FIG. 15.

In the case of FIGS. 5A and 5B, if it is assumed that the scale of the digest designated in the digest condition information is 40 seconds, five combinations of replays within 40 seconds are given: "replay 1 only", "replay 2 only", "replay 3 only", "replay 1+replay 2", and "replay 2+replay 3". The sums of the respective replay importance degrees are follows.

"replay 1 only": 203
"replay 2 only": 175.5
"replay 3 only": 104
"replay 1+replay 2": 378.5
"replay 2+replay 3": 279.5

As a result, "replay 1+replay 2" with the largest sum of the replay importance degrees is selected, and the replays are arranged in time series to create the digest information.

The output unit 50 of the receiving terminal 200 obtains and outputs the digest information created by the digest creating unit 40 (Step 8). In accordance with the digest information (FIG. 9), only replay videos between the replay broadcasting section start time and the replay broadcasting section end time designated in the digest information are sequentially displayed among accumulated present-broadcasting-video in the receiving terminal 200, and accordingly a digest that satisfies the designated scale can be displayed.

As described above, in the digest creating method, the configuration of the replay importance degree computing unit shown in the first to fourth embodiments is separated to be provided on the broadcasting station side and the receiving station side, and the computing of the importance degrees of the number of replays, an interval, a time length, a broadcasting speed, the number of cut switches and the like is performed in the broadcasting station. On the other hand, the computing of the importance degree for the replay information is performed in the receiving station. Therefore, the computing of the importance degree of each replay information can be performed between the both devices in a separating manner, and the digest information to which a preference of a user is added can be created.

It should be noted that although the second replay information obtained by the receiving terminal 200 is obtained through one-way communications, the information may be obtained through two-way communications. That is, the second replay information computed by the first replay importance degree computing unit 31 is managed in a database (not shown) in the center device 100, and the second replay information may be obtained by requesting from the receiving terminal 200 to the center device 100. Thereby, the digest creating processes are effectively performed between the both devices.

In the fifth embodiment, the digest condition information obtained by the digest creating unit 40 of the receiving terminal 200 is input by an operation of a user. However, the digest condition information set on the side of the center device 100 may be obtained. In any case, the digest information that satisfies the digest condition information set on the center device side or the receiving terminal side can be created.

In the fifth embodiment, "the first replay importance degree computing unit 311" and "the second replay importance degree computing unit 32" were explained by separating them to be provided in "the center device 100" and "the receiving terminal 200", respectively. It is obvious that these units can be operated in the same device, which is described in the above-described first embodiment.

Figure 31:
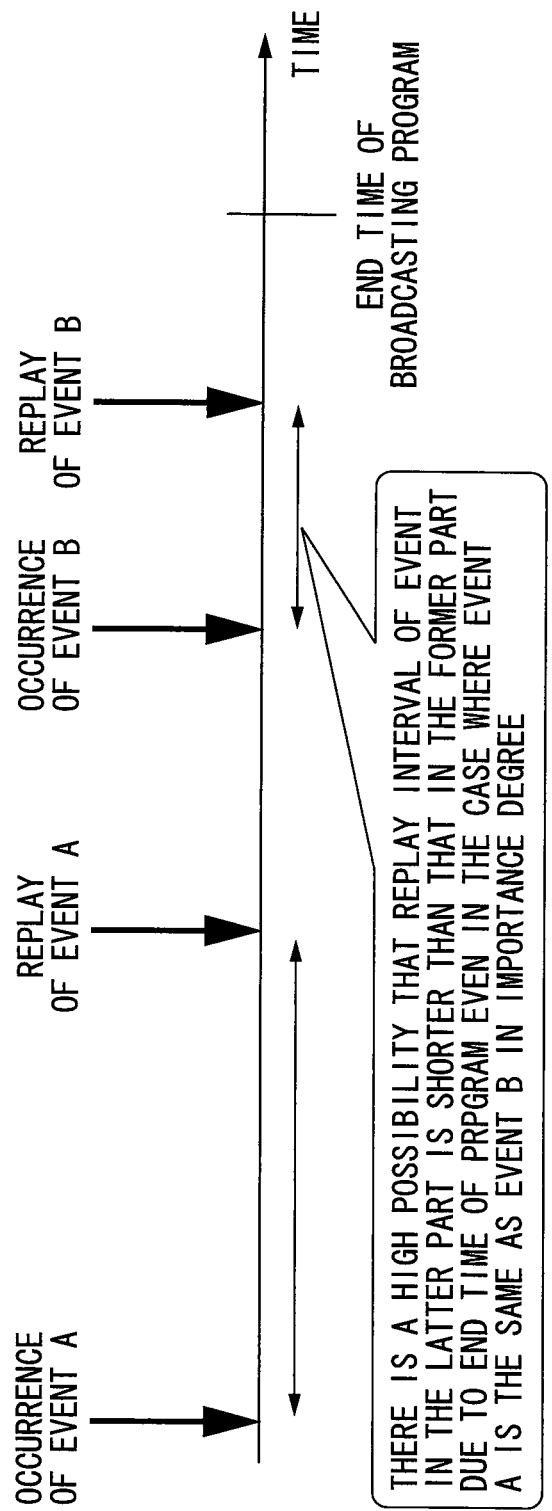
FIG. 31 is a diagram explaining a difference between replays of events which occur in the former part and the latter part of a game.

In addition, the method of computing the replay importance degrees may be a method other than that shown in the embodiment. For example, for the interval importance degree computed on the basis of "interval between the replay broadcasting section and the replay reference section", the importance degree computed on the basis of only the difference affects a time zone where an event occurs. That is, as shown in FIG. 31, even for the similar events, a replay of an event that occurred in the former part of a game is shorter in interval than a replay of an event that occurred in the latter part. Thus, the interval importance degree is not exactly reflected. Therefore, in consideration of remaining time of the broadcast of the game, the interval importance degree may be computed by the following formula. Further, the computing of the importance degree for interval shown in the embodiments is performed by multiplying the difference by constant value (1), however, the importance degree may be obtained by multiplying the difference by a logarithm replay interval importance degree=predetermined position of replay broadcasting section−predetermined position of replay reference section/broadcasting program end time−predetermined position of replay reference section     [Formula 1]

Figure 32:
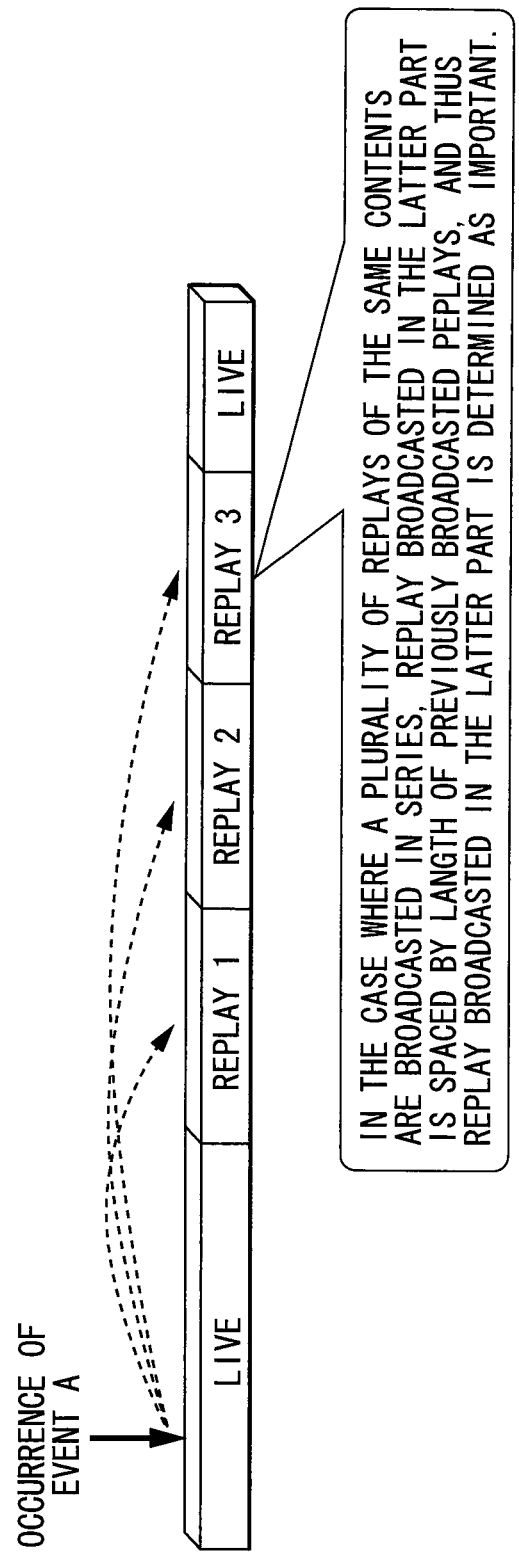
FIG. 32 is a diagram explaining a method of computing an interval importance degree in the case where replays of the same event are used in series.

For the interval importance degree computed on the basis of "interval between the replay broadcasting section and the replay reference section", in the case where the replay reference sections overlap with each other and the replay broadcasting sections are used in series, that is, replays of the same event are broadcasted in series, the interval importance degree of the replay information to be used later is spaced by the length of the replays used previously as shown in FIG. 32. Despite that the interval importance degree of the same value must be added, the interval importance degree of the replay information to be used later becomes large. Such replays are often broadcasted as in a case of replays of a strikeout scene at various angles in a baseball game, and therefore it does not mean that the replays to be used later are more important. Thus, in the case where the replay reference sections of the same event are used in series, the first replay-broadcasting-start-time is regarded as the replay broadcasting start time of the event to be used in series so as not to make a difference in computing the replay interval importance degree of such a case, and the computing of the replay interval importance degree is performed.

Figure 33:
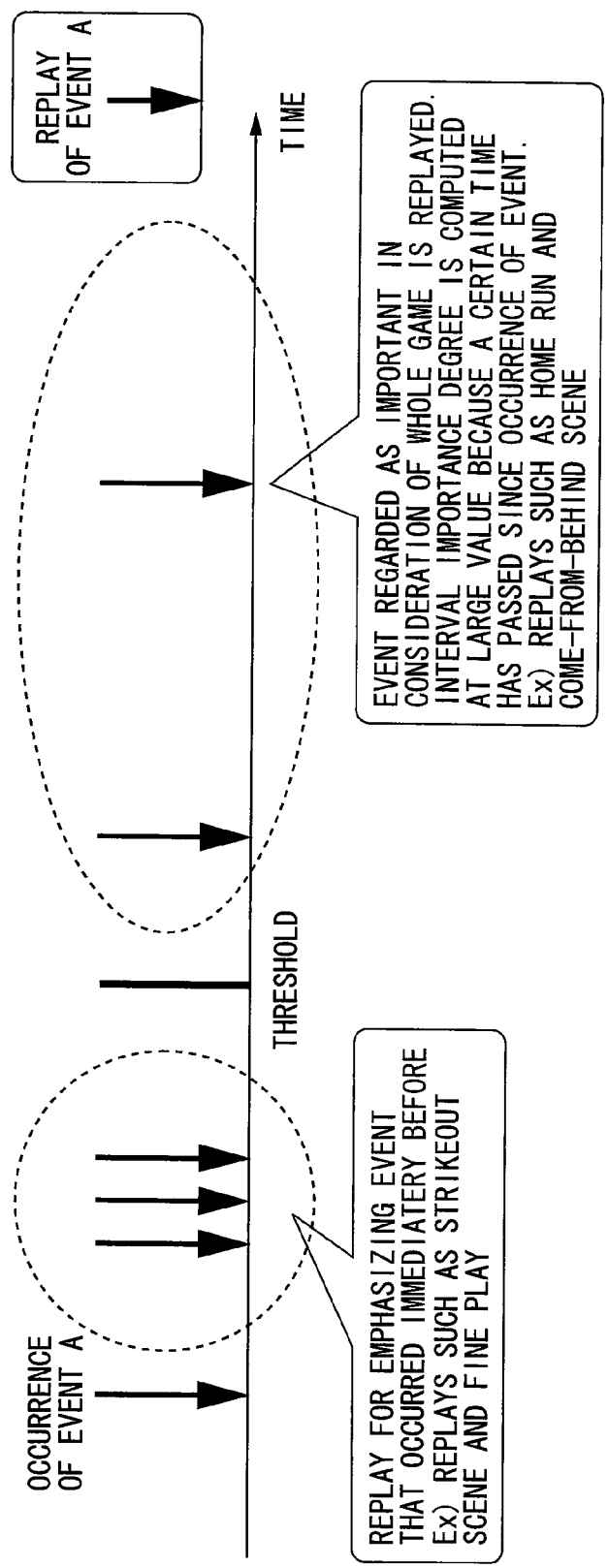
FIG. 33 is a diagram explaining computing of the interval importance degree, with the use of a threshold, for a replay used immediately after an event.

Replays used immediately after an event are used for mainly emphasizing the event. However, if means for computing a larger importance degree as an interval between the replay broadcasting section and the replay reference section is wider is set, the value of the interval importance degree for the replay used immediately after the event is computed at a small value, as shown in FIG. 33. The replays used immediately after the event include events such as "fine play" and "strikeout scene". These are not the events which directly affect a game, but can be used as digests. Thus, a threshold is set for an interval between predetermined positions of the replay broadcasting section and the replay reference section, and each replay video/sound may be classified into groups by use of the threshold. That is, by classifying with the use of the set threshold, the replay videos/sounds with different characteristics can be classified. For example, in the case where an interval between the predetermined positions of the replay broadcasting section and the replay reference section is smaller than the threshold, a group including replays such as a fine play and a strikeout scene immediately after an event is created. On the other hand, in the case where an interval between the predetermined positions of the replay broadcasting section and the replay reference section is larger than the threshold, a group including replays used when a certain time passes after occurrence of an event, that is, replays showing the course of a game can be created. For example, in the case where a user wishes to create a digest in which a fine play and a strikeout scene are emphasized, the interval importance degree is set at a large value by multiplying the replay interval importance degree of the replay video/sound in the corresponding group by a predetermined coefficient. On the other hand, in the case where a user wishes to create a digest in which the whole game is taken into account, the interval importance degree is set at a large value by multiplying the replay interval importance degree of the replay video/sound in the corresponding group by a predetermined coefficient. Thereby, viewers, digest creators and the like who use the digest creating device can obtain digest information in accordance with desired digest contents.

Figure 34:
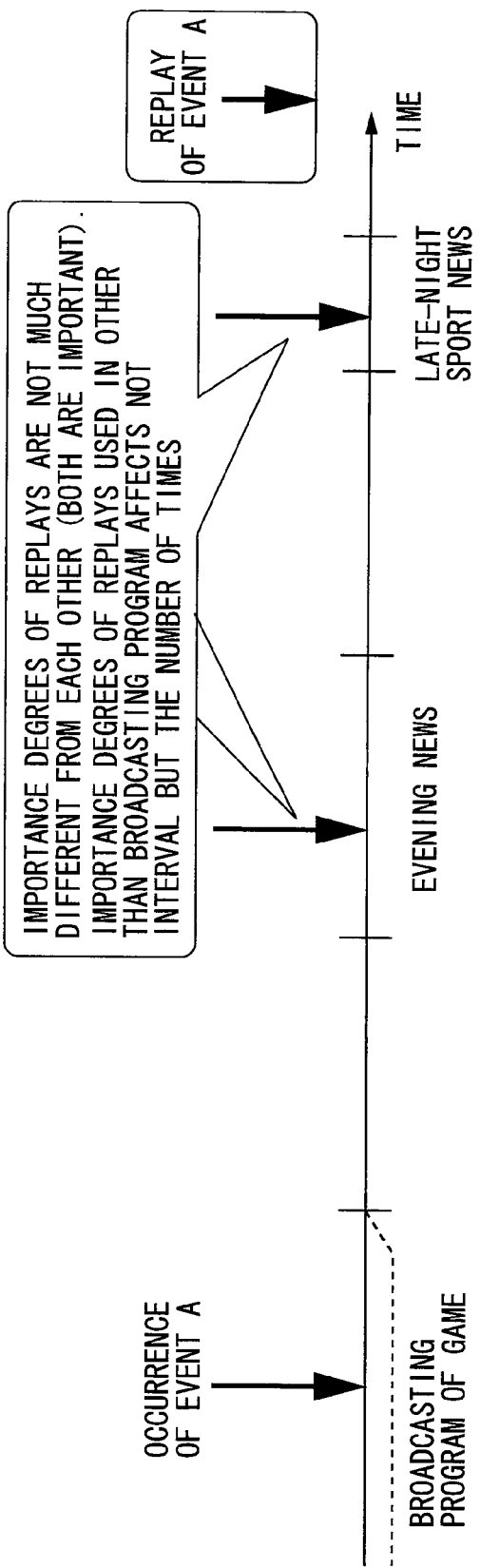
FIG. 34 is a diagram showing a method of computing the importance degree of a replay used in other than a broadcasting program.
Figure 35:
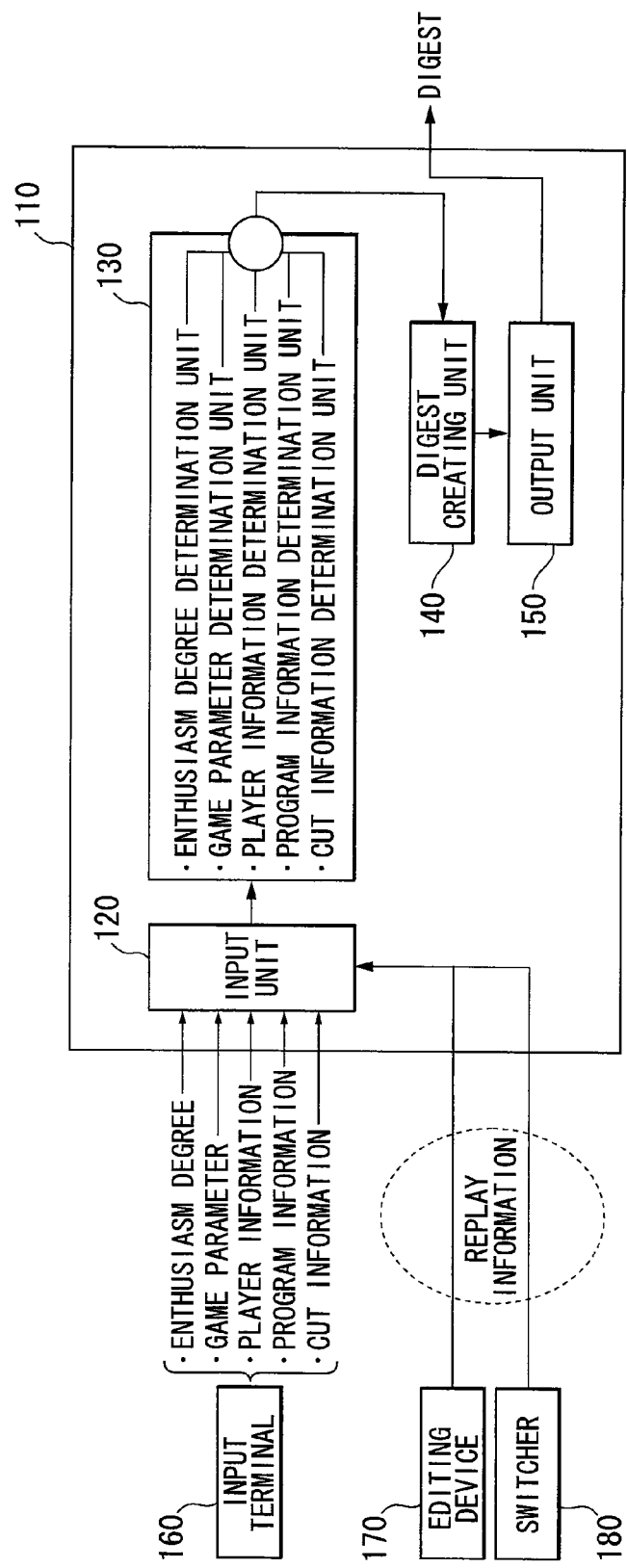
FIG. 35 is a block diagram showing a configuration of a conventional digest creating device.

Further, replays to be broadcasted after the end of a broadcasting program, for example, a broadcast in a news program and a sport program is largely involved in a program edition, and an interval between the replay broadcasting section and the replay reference section is not proportional to the importance degree. Thus, as shown in FIG. 34, for replay information to be broadcasted after the end of the broadcasting program, the replay interval importance degrees are not differentiated from each other, and the replay interval importance degrees are set at the same value. However, since it is conceivable that all replays to be broadcasted after the end of the broadcasting program are important, the importance degree should be set at a large value for the replay information to be broadcasted after the end of the broadcasting program. That is, it is necessary to individually set the computing method of the interval importance degree before and after the end of the broadcasting program.

Further, although the explanation has been made about the case that the importance degree of the replay video is differentiated on the basis of "interval" between the start time of the replay reference section and the start time of the replay broadcasting time in the above-described embodiment, it is also possible to differentiate the importance degree on the basis of the other "intervals". For example, the importance degree of the replay video may be differentiated on the basis of "interval" between the middle time of the replay reference section and the middle time of the replay broadcasting section.

Figure 13:
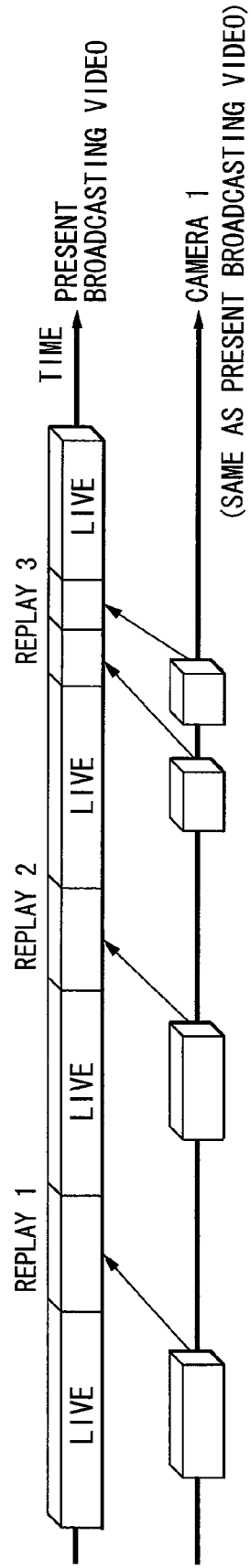

Further, although the explanation has been made about the case that plural filming cameras are used in the above-described embodiment, the number of cameras may be one as shown in FIG. 13A. In this case, it is not necessary to include the information of a filming camera number in the replay information as shown in FIG. 13B. Furthermore, the importance degree of the replay information may be differentiated depending on a camera number (the shooting direction of a camera) that filmed the replay video. Furthermore, the importance degree may be differentiated depending on the size of a sub screen of a displayed replay video and the effect of a CG display.

The digest creating method and program of the present invention are executed in the digest creating device, and a program for specifying operations of the digest creating device of the present invention can be transferred or copied to the other devices by storing on a recording medium.

The digest creating device of the present invention can be used for creating a digest of a program in combination with a broadcasting device in a broadcasting station, or can be used as a device for creating digest information for broadcasting. Further, the digest creating device of the present invention can also be used as a device that enables digest viewing of accumulated programs in combination with a receiving terminal.

In addition to a sport program, the digest creating device of the present invention can be applied to a case of creating a digest of a program belonging to the other genres such as a news program and a drama program in which replays are used. Further, the digest creating device of the present invention can also be applied to a case of a sound replay.

What is claimed is:

1. A digest creating device, comprising:
an input unit for inputting replay information, the replay information including:
   (a) replay broadcasting section information for specifying a broadcasting time zone of a replay video/sound;
   (b) replay reference section information for specifying an actual filming/recording time zone of the replay video/sound, and
   (c) digest condition information for designating a length of a digest;
a replay importance degree computing unit that computes an importance degree of the replay video/sound by executing a plurality of processes, the plurality of processes including:
   (1) computing a number of replays and judging that in the case where the number of replays is greater than a predetermined number, the replay has a high importance degree;
   (2) computing an interval between predetermined positions of the replay broadcasting section and the replay reference section and judging that in the case where an interval between the replay broadcasting section start time and the replay reference section start time is greater than a predetermined length, the replay has a high importance degree;
   (3) computing a speed of replay broadcasting, and judging that in the case where the replay broadcasting speed is less than a predetermined speed, the replay has a high importance degree; and
   (4) computing a number of cut switches of the replay and judging that in the case where the number of cut switches in the replay broadcasting section is greater than a predetermined number of cut switches, the replay has a high importance degree;
   wherein parameters for the processes are obtained from the replay information, and the replay information is output with the importance degree in which the importance degree is added to the replay information; and
a digest creating unit that receives the replay information with the importance degree and the digest condition information, and sets the replay video/sound as a digest candidate among a plurality of digest candidates to form a group of digest candidates;
wherein the group of digest candidates includes a plurality of combinations of digest candidates and a combination of digest candidates is selected from the plurality of combinations based on:
(i) a composite importance degree of the combination of digest candidates that is computed from the importance degrees of each digest candidate and
(ii) a range of the designated length of the digest; and
wherein the digest creating unit, in the procedure of selecting a combination of digest candidates, assumes all the replays as digest candidates, determines whether or not the total time length of the replays of the digest candidates exceeds a designated scale of the digest, further if exceeding, the digest creating unit checks whether or not there are any pieces of replay information in which the replay reference sections overlap with each other, and further if existing, the digest creating unit deletes the replay information with the smallest replay importance degree from the digest candidates.

2. The digest creating device according to claim 1, wherein the digest creating unit selects the combination of the digest candidates by excluding the replay video/sound of which the importance degree is not the largest among a plurality of replay videos/sounds in which the replay reference sections overlap with each other, from the digest candidates.

3. A digest creating device, comprising:
an input unit for inputting replay information, the replay information including:
   (a) replay broadcasting section information for specifying a broadcasting time zone of a replay video/sound,
   (b) replay reference section information for specifying an actual filming/recording time zone of the replay video/sound,
   (c) digest condition information for designating a length of a digest, and
   (d) information for indicating a section of a video/sound;
a replay importance degree computing unit that computes an importance degree of the replay video/sound by executing a plurality of processes, the plurality of processes including:
   (1) computing a number of replays and judging that in the case where the number of replays is greater than a predetermined number, the replay has a high importance degree,
   (2) computing an interval between predetermined positions of the replay broadcasting section and the replay reference section and judging that in the case where an interval between the replay broadcasting section start time and the replay reference section start time is greater than a predetermined length, the replay has a high importance degree;
   (3) computing a speed of replay broadcasting, and judging that in the case where the replay broadcasting speed is less than a predetermined speed, the replay has a high importance degree; and
   (4) computing a number of cut switches of the replay and judging that in the case where the number of cut switches in the replay broadcasting section is greater than a predetermined number of cut switches, the replay has a high importance degree;
   wherein parameters for the processes are obtained from the replay information, and the replay information is output with the importance degree in which the importance degree is added to the replay information; and
a digest creating unit that receives the replay information with the importance degree and the digest condition information, and sets the video/sound of the section containing the replay reference section of the replay video/sound as a digest candidate having the importance degree of the replay video/sound among a plurality of digest candidates to form a group of digest candidates;
wherein the group of digest candidates includes a plurality of combinations of digest candidates and a combination of digest candidates is selected from the plurality of combinations based on:
(i) a composite importance degree of the combination of digest candidates that is computed from the importance degrees of each digest candidate and
(ii) a range of the designated length of the digest; and
wherein the digest creating unit, in the procedure of selecting a combination of digest candidates, assumes all the replays as digest candidates, determines whether or not the total time length of the replays of the digest candidates exceeds a designated scale of the digest, further if exceeding, the digest creating unit checks whether or not there are any pieces of replay information in which the replay reference sections overlap with each other, and further if existing, the digest creating unit deletes the replay information with the smallest replay importance degree from the digest candidates.

4. A digest creating device, comprising:

an input unit for inputting replay information, the replay information including:
- (a) replay broadcasting section information for specifying a broadcasting time zone of a replay video/sound,
- (b) replay reference section information for specifying an actual filming/recording time zone of the replay video/sound,
- (c) digest condition information for designating a length of a digest, and
- (d) cut specifying information for indicating a switching point of a broadcasting cut of a video/sound;

a replay importance degree computing unit that computes an importance degree of the replay video/sound by executing a plurality of processes, the plurality of processes including:
- (1) computing a number of replays and judging that in the case where the number of replays is greater than a predetermined number, the replay has a high importance degree;
- (2) computing an interval between predetermined positions of the replay broadcasting section and the replay reference section and judging that in the case where an interval between the replay broadcasting section start time and the replay reference section start time is greater than a predetermined length, the replay has a high importance degree;
- (3) computing a speed of replay broadcasting, and judging that in the case where the replay broadcasting speed is less than a predetermined speed, the replay has a high importance degree; and
- (4) computing a number of cut switches of the replay and judging that in the case where the number of cut switches in the replay broadcasting section is greater than a predetermined number of cut switches, the replay has a high importance degree;

wherein parameters for the processes are obtained from the replay information, and the replay information is output with the importance degree in which the importance degree is added to the replay information; and a digest creating unit that receives the replay information with the importance degree, the digest condition information, and the cut specifying information, and sets the broadcasting cut containing the replay reference section of the replay video/sound as a digest candidate having the importance degree of the replay video/sound among a plurality of digest candidates to form a group of digest candidates;

wherein the group of digest candidates includes a plurality of combinations of digest candidates and a combination of digest candidates is selected from the plurality of combinations based on:
- (i) a composite importance degree of the combination of digest candidates that is computed from the importance degrees of each digest candidate and
- (ii) a range of the designated length of the digest; and wherein the digest creating unit, in the procedure of selecting a combination of digest candidates, assumes all the replays as digest candidates, determines whether or not the total time length of the replays of the digest candidates exceeds a designated scale of the digest, further if exceeding, the digest creating unit checks whether or not there are any pieces of replay information in which the replay reference sections overlap with each other, and further if existing, the digest creating unit deletes the replay information with the smallest replay importance degree from the digest candidates.

5. A digest creating device, comprising:

an input unit for inputting replay information, the replay information including:
- (a) replay broadcasting section information for specifying a broadcasting time zone of a replay video/sound;
- (b) replay reference section information for specifying an actual filming/recording time zone of the replay video/sound,
- (c) digest condition information for designating a length of a digest, and
- (d) scene information for indicating a scene of a broadcasting video/sound;

a replay importance degree computing unit that computes an importance degree of the replay video/sound by executing a plurality of processes, the plurality of processes including:
- (1) computing a number of replays and judging that in the case where the number of replays is greater than a predetermined number, the replay has a high importance degree;
- (2) computing an interval between predetermined positions of the replay broadcasting section and the replay reference section and judging that in the case where an interval between the replay broadcasting section start time and the replay reference section is greater than a predetermined length, the start time is the replay has a high importance degree;
- (3) computing a speed of replay broadcasting, and judging that in the case where the replay broadcasting speed is less than the predetermined speed, the replay has a high importance degree; and
- (4) computing a number of cut switches of the replay and judging that in the case where the number of cut switches in the replay broadcasting section is greater than a predetermined number of cut switches, the replay has a high importance degree;

wherein parameters for the processes are obtained from the replay information, and the replay information is output with the importance degree in which the importance degree is added to the replay information; and a digest creating unit that receives the replay information with the importance degree, the digest condition information, and the scene information, and sets the video/sound segment of the scene information containing the replay reference section of the replay video/sound as a digest candidate having the importance degree of the replay video/sound among a plurality of a plurality of digest candidates to form a group of digest candidates;

wherein the group of digest candidates includes a plurality of combinations of digest candidates and a combination of digest candidates is selected from the plurality of combinations based on:
- (i) a composite importance degree of the combination of digest candidates that is computed from the importance degrees of each digest candidate and
- (ii) a range of the designated length of the digest; and wherein the digest creating unit, in the procedure of selecting a combination of digest candidates, assumes all the replays as digest candidates, determines whether or not the total time length of the replays of the digest candidates exceeds a designated scale of the digest, further if exceeding, the digest creating unit checks whether or not there are any pieces of replay information in which the replay reference sections overlap with each other, and further if existing, the digest creating unit deletes the replay information with the smallest replay importance degree from the digest candidates.

6. The digest creating device according to claim 3 or 5, wherein the digest creating unit changes a size of the scene of the video/sound containing the replay reference section in accordance with the importance degree of the replay video/sound.

7. The digest creating device as in claim 1, 3, 4 or 5, wherein the replay importance degree computing unit adds the importance degrees to a plurality of replay videos/sounds in which the replay broadcasting sections are arranged in series and the replay reference sections do not overlap with each other.

8. The digest creating device as in claim 1, 3, 4 or 5, wherein the replay importance degree computing unit includes:
a first replay importance degree computing unit that computes at least one importance degree of the number of replays, the interval between predetermined positions of the replay broadcasting section and the replay reference section, the speed of replay broadcasting, and the number of cut switches of the replay on the basis of the replay information; and
a second replay importance degree computing unit that computes the importance degree of the replay information on the basis of each importance degree computed by the first replay importance degree computing unit.

9. The digest creating device according to claim 8, wherein the first replay importance degree computing unit is provided on the broadcasting station side, and the second replay importance degree computing unit is provided on the receiving station side.

10. The digest creating device as in claims 1, 3, 4 or 5, wherein the replay interval importance degree computed on the basis of the interval between predetermined positions of the replay broadcasting section and the replay reference section is obtained by multiplying a difference by a constant or a logarithm.

11. The digest creating device as in claims 1, 3, 4 or 5, wherein the replay interval importance degree computed on the basis of the interval between predetermined positions of the replay broadcasting section and the replay reference section is computed by use of the following formula:

replay interval importance degree=predetermined position of replay broadcasting section−predetermined position of replay reference section/broadcasting program end time−predetermined position of replay reference section        [Formula 1].

12. The digest creating device as in claims 1, 3, 4 or 5, wherein in the case where the replay reference sections overlap with each other and the replay broadcasting sections are used in series, the replay interval importance degree is computed on the basis of the interval between predetermined positions of the replay broadcasting section and the replay reference section is computed by assuming the predetermined position of the replay broadcasting section to be used first as a predetermined position of the replay broadcasting sections of events to be used in series.

13. The digest creating device as in claims 1, 3, 4 or 5, wherein the replay interval importance degree is computed on the basis of the interval between predetermined positions of the replay broadcasting section and the replay reference section is computed in such a manner that the replay videos/sounds are classified into groups by use of a threshold set for the interval between predetermined positions of the replay broadcasting section and the replay reference section and the replay interval importance degree of the replay video/sound in the corresponding group is multiplied by a predetermined coefficient in accordance with digest contents selected by a user.

14. A digest creating method, comprising the steps of:
computing an importance degree of a replay video/sound by executing a plurality of processes, the plurality of processes including:
  (1) computing a number of replays and judging that in the case where the number of replays is greater than a predetermined number, the replay has a high importance degree;
  (2) computing an interval between predetermined positions of a replay broadcasting section and a replay reference section and judging that in the case where an interval between the replay broadcasting section start time and the replay reference section start time is greater than a predetermined length, the replay has a high importance degree;
  (3) computing a speed of replay broadcasting, and judging that in the case where the replay broadcasting speed is less than a predetermined speed, the replay has a high importance degree; and
  (4) computing a number of cut switches of the replay and judging that in the case where the number of cut switches in the replay broadcasting section is greater than a predetermined number of cut switches, the replay has a high importance degree;
wherein parameters for the processes are obtained from replay information, the replay information including:
  (a) replay broadcasting section information for specifying a broadcasting time zone of the replay video/sound, and
  (b) replay reference section information for specifying an actual filming/recording time zone of the replay video/sound;
setting the replay video/sound as a digest candidate among a plurality of digest candidates to form a group of digest candidates; and
selecting a combination of digest candidates from a plurality of combinations of digest candidates included in the group of digest candidates based on:
  (i) a composite importance degree of the combination of digest candidates that is computed from the importance degrees of each digest candidate, and
  (ii) a range of a designated length of a digest; and
  in the step of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

15. The digest creating method according to claim 14, further comprising the step of selecting, in the case where there are a plurality of replay videos/sounds in which the relay reference sections overlap with each other, the combination by excluding the replay video/sound of which the importance degree is not the largest among the replay videos/sounds from the digest candidates.

16. A digest creating method, comprising the steps of:
computing an importance degree of a replay video/sound by executing a plurality of processes, the plurality of processes including:
   (1) computing a number of replays and judging that in the case where the number of replays is greater than a predetermined number, the replay has a high importance degree;
   (2) computing an interval between predetermined positions of a replay broadcasting section and a replay reference section and judging that in the case where an interval between the replay broadcasting section start time and the replay reference section start time is greater than a predetermined length, the replay has a high importance degree;
   (3) computing a speed of replay broadcasting, and judging that in the case where the replay broadcasting speed is less than a predetermined speed, the replay has a high importance degree; and
   (4) computing a number of cut switches of the replay and judging that in the case where the number of cut switches in the replay broadcasting section is greater than a predetermined number of cut switches, the replay has a high importance of degree;
wherein parameters for the processes are obtained from replay information, the replay information including:
   (a) replay broadcasting section information for specifying a broadcasting time zone of the replay video/sound and
   (b) replay reference section information for specifying an actual filming/recording time zone of the replay video/sound; and
setting a video/sound of a section containing the replay reference section of the replay video/sound as a digest candidate having the importance degree of the replay video/sound, wherein the digest candidate is set among a plurality of digest candidates to form a group of digest candidates;
selecting a combination of digest candidates from a plurality of combinations of digest candidates included in the group of digest candidates based on:
   (i) a composite importance degree of the combination of digest candidates that is computed from the importance degrees of each digest candidate, and
   (ii) a range of a designated length of a digest; and
   in the step of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

17. A digest creating method, comprising the steps of:
computing an importance degree of a replay video/sound by executing a plurality of processes, the plurality of processes including:
   (1) computing a number of replays and judging that in the case where the number of replays is greater than a predetermined number, the replay has a high importance degree;
   (2) computing an interval between predetermined positions of a replay broadcasting section and a replay reference section and judging that in the case where an interval between the replay broadcasting section start time and the replay reference section start time is greater than a predetermined length, the replay has a high importance degree;
   (3) computing a speed of replay broadcasting, and judging that in the case where the replay broadcasting speed is less than a predetermined speed, the replay has a high importance degree; and
   (4) computing a number of cut switches of the replay and judging that in the case where the number of cut switches in the replay broadcasting section is greater than a predetermined number of cut switches, the replay has a high importance degree;
wherein parameters for the processes are obtained from replay information, the replay information including:
   (a) replay broadcasting section information for specifying a broadcasting time zone of the replay video/sound; and
   (b) replay reference section information for specifying an actual filming/recording time zone of the replay video/sound; and
setting a broadcasting cut of a video/sound containing the replay reference section of the replay video/sound as a digest candidate having the importance degree of the replay video/sound, wherein the digest candidate is set among a plurality of digest candidates to form a group of digest candidates;
selecting a combination of digest candidates from a plurality of combinations of digest candidates included in the group of digest candidates based on:
   (i) a composite importance degree of the combination of digest candidates that is computed from the importance degrees of each digest candidate, and
   (ii) a range of a designated length of a digest; and
   in the step of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

18. A digest creating method, comprising the steps of:
computing an importance degree of a replay video/sound by executing a plurality of processes, the plurality of processes including:
   (1) computing a number of replays and judging that in the case where the number of replays is greater than a predetermined number, the replay has a high importance degree;
   (2) computing an interval between predetermined positions of a replay broadcasting section and a replay reference section and judging that in the case where an interval between the replay broadcasting section start time and the replay reference section start time is greater than a predetermined length, the replay has a high importance degree;
   (3) computing a speed of replay broadcasting, and judging that in the case where the replay broadcasting speed is less than a predetermined speed, the replay has a high importance degree; and (4) computing a number of cut switches of the replay and judging that in the case where the number of cut switches in the replay broadcasting section is greater than a predetermined number of cut switches, the replay has a high importance degree;

wherein parameters for the processes are obtained from replay information, the replay information including
(a) replay broadcasting section information for specifying a broadcasting time zone of the replay video/sound; and
(b) replay reference section information for specifying an actual filming/recording time zone of the replay video/sound;

setting a scene of a video/sound segment of scene information containing the replay reference section of the replay video/sound as a digest candidate having the importance degree of the replay video/sound, wherein the digest candidate is set among a plurality of digest candidates to form a group of digest candidates; and outputting information for selecting a combination of digest candidates from a plurality of combinations of digest candidates included in the group of digest candidates based on:
(i) a composite importance degree of the combination of digest candidates that is computed from the importance degrees of each digest candidate, and
(ii) a range of a designated length of a digest; and
in the step of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

19. The digest creating method according to claim 16 or 18, further comprising the step of changing a size of the scene of the video/sound containing the replay reference section in accordance with the importance degree of the replay video/sound.

20. The digest creating method according to any one of claims 14, 16, 17 or 18, further comprising the step of adding the importance degrees to a plurality of replay videos/sounds in which the replay broadcasting sections are arranged in series and the replay reference sections do not overlap with each other.

21. A non-transitory computer readable medium including a program that causes a computer to execute the procedures of:
computing an importance degree of a replay video/sound by executing a plurality of parameters, the plurality of processes including:
(1) computing a number of replays and judging that in the case where the number of replays is greater than a predetermined number, the replay has a high importance degree;
(2) computing an interval between predetermined positions of a replay broadcasting section and a replay reference section and judging that in the case where an interval between the replay broadcasting section start time and the replay reference section start time is greater than a predetermined length, the replay has a high importance degree;
(3) computing a speed of replay broadcasting, and judging that in the case where the replay broadcasting speed is less than a predetermined speed, the replay has a high importance degree; and
(4) computing a number of cut switches of the replay and judging that in the case where the number of cut switches in the replay broadcasting section is greater than a predetermined number of cut switches, the replay has a high importance degree;

wherein parameters for the processes are obtained from replay information, the replay information including:
(a) replay broadcasting section information for specifying a broadcasting time zone of the replay video/sound; and
(b) replay reference section information for specifying an actual filming/recording time zone of the replay video/sound;

setting the replay video/sound as a digest candidate among a plurality of digest candidates to form a group of digest candidates; and selecting a combination of digest candidates from a plurality of combinations of digest candidates included in the group of digest candidates based on:
(i) a composite importance degree of the combination of digest candidates that is computed from the importance degrees of each digest candidate, and
(ii) a range of a designated length of a digest; and
in the procedure of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

22. A non-transitory computer readable medium including a program which causes a computer to execute the procedures of:
computing an importance degree of a replay video/sound by executing a plurality of processes, the plurality of processes including:
(1) computing a number of replays and judging that in the case where the number of replays is greater than a predetermined number, the replay has a high importance degree;
(2) computing an interval between predetermined positions of a replay broadcasting section and a replay reference section and judging that in the case where an interval between the replay broadcasting section start time and the replay reference section start time is greater than a predetermined length, the replay has a high importance degree;
(3) computing a speed of replay broadcasting, and judging that in the case where the replay broadcasting speed is less than a predetermined speed, the replay has a high importance degree; and
(4) computing a number of cut switches of the replay and judging that in the case where the number of cut switches in the replay broadcasting section is greater than a predetermined number of cut switches, the replay has a high importance degree;

wherein parameters for the processes are obtained from replay information, the replay information including:
(a) replay broadcasting section information for specifying a broadcasting time zone of the replay video/sound; and (b) replay reference section information for specifying an actual filming/recording time zone of the replay video/sound;

setting a video/sound of a section containing the replay reference section of the replay video/sound as a digest candidate having the importance degree of the replay video/sound, wherein the digest candidate is set among a plurality of digest candidates to form a group of digest candidates; and selecting a combination of digest candidates from a plurality of combinations of digest candidates included in the group of digest candidates based on:
  (i) a composite importance degree of the combination of digest candidates that is computed from the importance degrees of each digest candidate, and
  (ii) a range of the designated length of a digest; and
  in the procedure of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

23. A non-transitory computer readable medium including a program which causes a computer to execute the procedures of:

computing an importance degree of a replay video/sound by executing a plurality of processes, the plurality of processes including:
  (1) computing a number of replays and judging that in the case where the number of replays is greater than a predetermined number, the replay has a high importance degree;
  (2) computing an interval between predetermined positions of a replay broadcasting section and a replay reference section and judging that in the case where an interval between the replay broadcasting section start time and the replay reference section start time is greater than a predetermined length, the replay has a high importance degree;
  (3) computing a speed of replay broadcasting, and judging that in the case where the replay broadcasting speed is less than a predetermined speed, the replay has a high importance degree; and
  (4) computing a number of cut switches of the replay and judging that in the case where the number of cut switches in the replay broadcasting section is greater than a predetermined number of cut switches, the replay has a high importance degree;
wherein parameters for the processes are obtained from replay information, the replay information including:
  (a) replay broadcasting section information for specifying a broadcasting time zone of the replay video/sound; and
  (b) replay reference section information for specifying an actual filming/recording time zone of the replay video/sound;

setting a broadcasting cut of a video/sound containing the replay reference section of the replay video/sound as a digest candidate having the importance degree of the replay video/sound, wherein the digest candidate is set among a plurality of digest candidates to form a group of digest candidates; and selecting a combination of digest candidates from a plurality of combinations of digest candidates included in the group of digest candidates based on:
  (i) a composite importance degree of the combination of digest candidates that is computed from the importance degrees of each digest candidate, and
  (ii) a range of a designated length of a digest; and
  in the procedure of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

24. A non-transitory computer readable medium including a program which causes a computer to execute the procedures of:

computing an importance degree of a replay video/sound by executing a plurality of processes, the plurality of processes including:
  (1) computing a number of replays and judging that in the case where the number of replays is greater than a predetermined number, the replay has a high importance degree;
  (2) computing an interval between predetermined positions of a replay broadcasting section and a replay reference section and judging that in the case where an interval between the replay broadcasting section start time and the replay reference section start time is greater than a predetermined length, the replay has a high importance degree;
  (3) computing a speed of replay broadcasting, and judging that in the case where the replay broadcasting speed is less than a predetermined speed, the replay has a high importance degree; and
  (4) computing a number of cut switches of the replay and judging that in the case where the number of cut switches in the replay broadcasting section is greater than a predetermined number of cut switches, the replay has a high importance degree;
wherein parameters for the processes are obtained from replay information, the replay information including:
  (a) replay broadcasting section information for specifying a broadcasting time zone of the replay video/sound; and
  (b) replay reference section information for specifying an actual filming/recording time zone of the replay video/sound;

selecting a class for a scene of a video/sound segment of scene information in accordance with the importance degree of the replay video/sound;

setting the scene, in the class, of the video/sound containing the replay reference section of the replay video/sound as a digest candidate having the importance degree of the replay video/sound, wherein the digest candidate is set among a plurality of digest candidates to form a group of digest candidates; and selecting a combination of digest candidates from a plurality of combinations of digest candidates included in the group of digest candidates based on:
  (i) a composite importance degree of the combination of digest candidates that is computed from the importance degrees of each digest candidate, and (ii) a range of a designated length of a digest; and in the procedure of selecting a combination of digest candidates, all the replays are assumed as digest candidates, and it is determined whether or not the total time length of the replays of the digest candidates exceeds a designated scale of the digest, further if exceeding, it is checked whether or not there are any pieces of replay information in which the replay reference sections overlap with each other, and further if existing, the replay information with the smallest replay importance degree is deleted from the digest candidates.

* * * * *

UNITED STATES PATENT AND TRADEMARK OFFICE
CERTIFICATE OF CORRECTION

PATENT NO.       : 8,544,037 B2                                              Page 1 of 1
APPLICATION NO.  : 11/572957
DATED            : September 24, 2013
INVENTOR(S)      : Terada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this

Fifteenth Day of September, 2015

Michelle K. Lee
*Director of the United States Patent and Trademark Office*